US012726904B2

(12) United States Patent
Guo

(10) Patent No.: US 12,726,904 B2
(45) Date of Patent: Sep. 1, 2026

(54) ENERGY-SAVING METHOD AND COMMUNICATION APPARATUS APPLIED TO MULTI-LINK COMMUNICATION

(71) Applicant: HUAWEI TECHNOLOGIES CO., LTD., Shenzhen (CN)

(72) Inventor: Yuchen Guo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 708 days.

(21) Appl. No.: 17/902,020

(22) Filed: Sep. 2, 2022

(65) Prior Publication Data

US 2022/0417857 A1 Dec. 29, 2022

Related U.S. Application Data

(63) Continuation of application No. PCT/CN2021/079226, filed on Mar. 5, 2021.

(30) Foreign Application Priority Data

Mar. 6, 2020 (CN) ........................ 202010151289.2

(51) Int. Cl.
*H04W 52/02* (2009.01)
*H04W 76/15* (2018.01)

(52) U.S. Cl.
CPC ....... *H04W 52/0235* (2013.01); *H04W 76/15* (2018.02)

(58) Field of Classification Search
CPC ..... H04W 52/02; H04W 52/28; H04W 72/04; H04W 72/20; H04W 76/15; H04W 76/23;
(Continued)

(56) References Cited

U.S. PATENT DOCUMENTS 11,304,133 B2 * 4/2022 Kneckt ............. H04W 52/0209
11,357,006 B2 * 6/2022 Kurian .................... H04W 4/80
(Continued)

FOREIGN PATENT DOCUMENTS

WO 2018098825 A1 6/2018
WO 2019004055 A1 1/2019
WO 2019139789 A1 7/2019

OTHER PUBLICATIONS

IEEE 802.11-2020/0070, Yonggang Fang et al, Multi-Link Power Saving Discussion, Jan. 2020, 12 pages.
(Continued)

*Primary Examiner* — Man U Phan
(74) *Attorney, Agent, or Firm* — HAUPTMAN HAM, LLP

(57) ABSTRACT

A power save method and a communication apparatus that are applied to multi-link communication. A multi-link device sends a mode switching frame to another device to notify the other device that the multi-link device is to switch a communication mode, for example, switch from a multi-link conventional communication mode to a multi-link power save communication mode, or switch from the multi-link power save communication mode to the multi-link conventional communication mode. The multi-link conventional communication mode includes a first configuration. The multi-link power save communication mode includes the first configuration and a second configuration. A quantity of links used for transmission under the first configuration is greater than a quantity of links used for transmission under the second configuration. A balance is provided between a high rate and low power consumption.

21 Claims, 13 Drawing Sheets

(58) Field of Classification Search

CPC ..... H04W 76/28; H04W 76/19; H04W 76/02; H04W 74/08; H04W 36/06; H04W 48/16; H04W 88/06; H04W 88/10; H04W 84/12; H04W 36/00; H04W 40/24; H04W 4/80; H04L 5/00; H04L 5/02; H04L 29/08; H04L 69/32

USPC .......................................................... 370/318

See application file for complete search history.

(56) References Cited

U.S. PATENT DOCUMENTS

| | | | | |
|---|---|---|---|---|
| 11,606,841 | B2 * | 3/2023 | Park | H04W 74/0816 |
| 11,765,707 | B2 * | 9/2023 | Kurian | H04W 4/80<br>370/329 |
| 2015/0181469 | A1 | 6/2015 | Yu et al. | |
| 2018/0206190 | A1 * | 7/2018 | Cherian | H04L 5/00 |
| 2019/0335454 | A1 | 10/2019 | Huang et al. | |
| 2021/0100053 | A1 * | 4/2021 | Park | H04L 1/1614 |
| 2022/0191786 | A1 * | 6/2022 | Kneckt | H04W 52/0209 |
| 2022/0400435 | A1 * | 12/2022 | Dong | H04W 52/028 |
| 2023/0115361 | A1 * | 4/2023 | Kim | H04W 52/0216<br>370/311 |
| 2023/0156578 | A1 * | 5/2023 | Kim | H04W 48/16<br>455/434 |
| 2023/0292385 | A1 * | 9/2023 | Kishida | H04W 76/15 |
| 2024/0205998 | A1 * | 6/2024 | Kim | H04W 76/15 |
| 2024/0314687 | A1 * | 9/2024 | Dong | H04W 36/06 |

OTHER PUBLICATIONS

International Search Report issued in corresponding International Application No. PCT/CN2021/079226, dated May 27, 2021, pp. 1-10.

India Office Action issued in corresponding India Application No. 202237056718, dated Jul. 28, 2023, pp. 1-6.

European Office Action issued in corresponding European Application No. 21764427.7, dated Jul. 4, 2024, pp. 1-4.

* cited by examiner

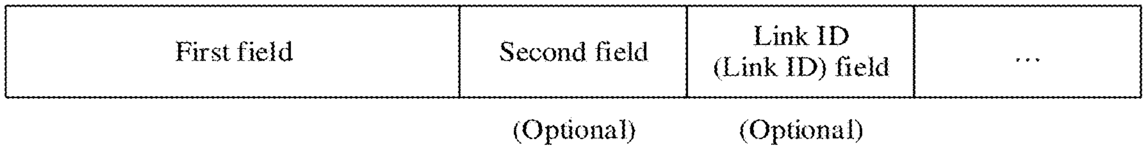

First device

Second device

610: Perform communication by using a first configuration

620: Send a first message, where the first message is used to notify that a communication mode is switched to a second communication mode 630: Perform communication by using a second configuration 601: Perform communication by using the second configuration 602: Send a radio frame by using a first parameter 603: Switch to the first configuration 604: Send data by using a second parameter 605: When a preset condition is met, restore the second configuration for communication

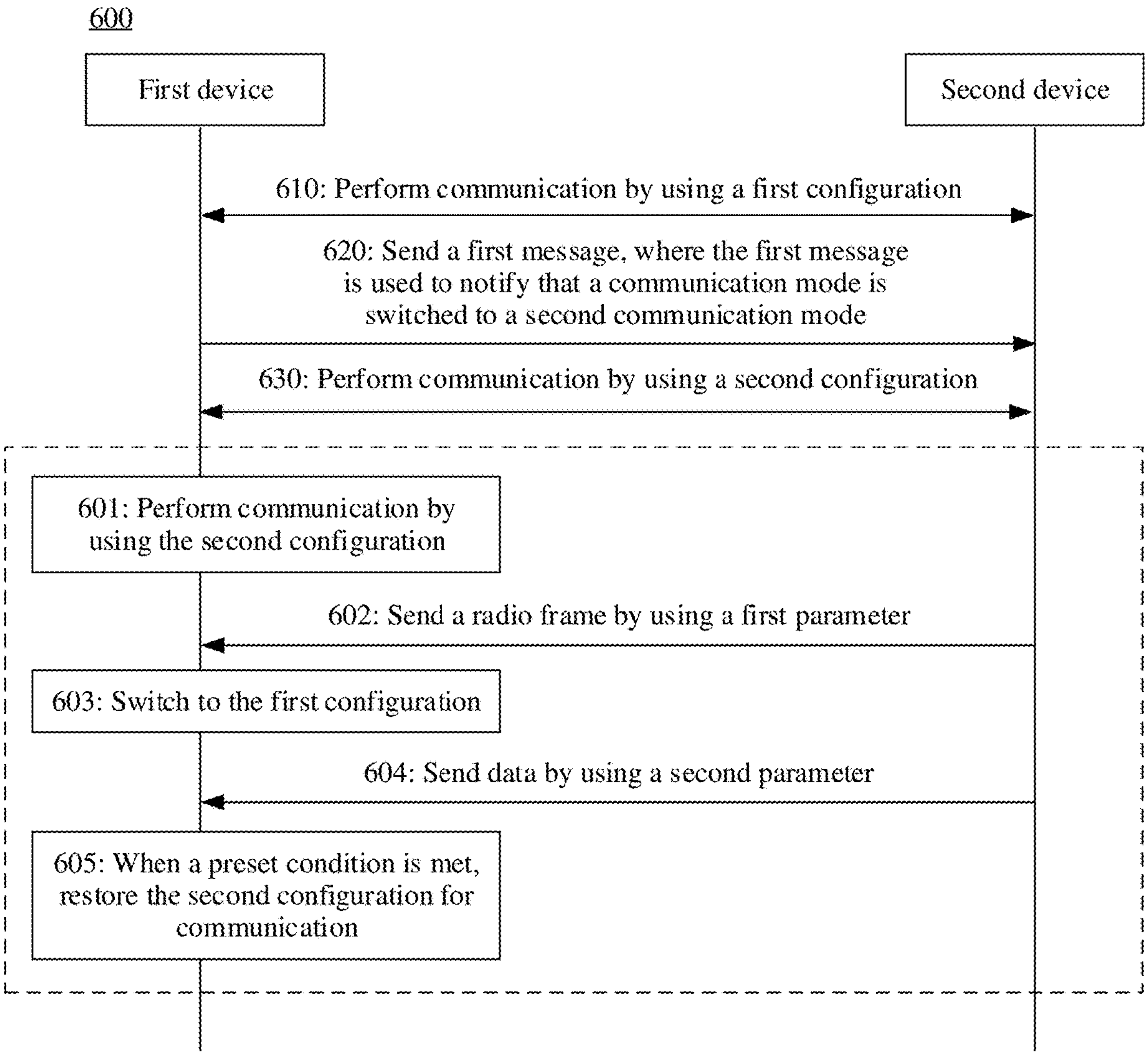

FIG. 6

| | | | | |
|---|---|---|---|---|
| SS allocation (SS allocation) | Link ID 1 (Link ID 1) | Link ID 2 (Link ID 2) | Link ID 3 (Link ID 3) | Link ID 4 (Link ID 4) |
FIG. 13
| | |
|---|---|
| SS allocation (SS allocation) | Link bitmap (Link bitmap) |
FIG. 14
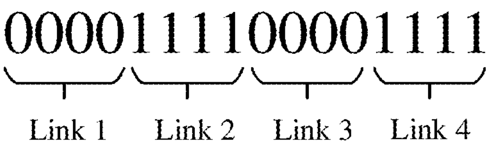
FIG. 15
| | | | | |
|---|---|---|---|---|
| Link ID (Link ID) | NSS | ... | Link ID (Link ID) | NSS |
FIG. 16
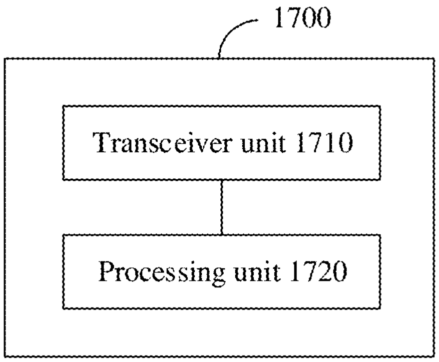
FIG. 17

ENERGY-SAVING METHOD AND COMMUNICATION APPARATUS APPLIED TO MULTI-LINK COMMUNICATION

CROSS-REFERENCE TO RELATED APPLICATIONS

This application is a continuation of International Application No. PCT/CN2021/079226, filed on Mar. 5, 2021, which claims priority to Chinese Patent Application No. 202010151289.2, filed on Mar. 6, 2020. The disclosures of the aforementioned applications are hereby incorporated by reference in their entireties.

BACKGROUND

With development of wireless technologies, increasingly more wireless devices support multi-link communication. For example, a device may simultaneously perform communication on a plurality of frequency bands, for example, simultaneously perform communication on frequency bands of 2.4 gigahertz (GHz), 5 GHz, and 6 GHz; or a device may simultaneously perform communication on different channels in a same frequency band. This can improve a communication rate between devices.

In multi-link communication, a communication rate can be improved by using more antennas and more radio frequency (RF) chains (RF chains). However, more antennas and more radio frequency chains may cause higher energy consumption.

Therefore, how to achieve a balance between a high rate and low power consumption is an urgent problem to be resolved.

SUMMARY

At least one embodiment provides a power save method and a communication apparatus that are applied to multi-link communication, to achieve a balance between a high rate and low power consumption.

According to a first aspect, a communication mode switching method is provided. The method is performed by a first device, or is performed by a chip, a circuit, or a processing system configured in the first device. This is not limited in this application. For example, due to a difference in an integration level, the first device is a device, or is a part of a device, for example, a chip system or a processing system. This is not limited in embodiments described herein. The first device is, for example, a multi-link device such as a multi-link station device.

The method includes: The first device sends a first message to a second device, where the first message is used to notify the second device that the first device switches a communication mode, and the switching a communication mode includes: switching from a first communication mode to a second communication mode, or switching from the second communication mode to the first communication mode; and the first device switches from the first communication mode to the second communication mode, or the first device switches from the second communication mode to the first communication mode, where the first communication mode includes a first configuration, the second communication mode includes the first configuration and a second configuration, under the first configuration, the first device performs communication on N links, under the second configuration, the first device performs communication on M links, M is an integer greater than 1 or equal to 1, N is an integer greater than 2 or equal to 2, and N is greater than M. Optionally, that the first message is used to notify the second device that the first device switches a communication mode includes: The first message is used to notify the second device that the first device switches the communication mode; or the first message is used to request to the second device that the first device switches the communication mode.

Optionally, that the first communication mode includes a first configuration indicates that after the first device switches from the second communication mode to the first communication mode, the first device performs communication by using the first configuration.

Optionally, that the second communication mode includes the first configuration and a second configuration indicates that after the first device switches from the first communication mode to the second communication mode, the first device performs communication by using the first configuration, or performs communication by using the second configuration.

Based on the foregoing technical solution, the first device serving as the multi-link device dynamically switches between different communication modes. For example, the first device dynamically switches between different communication modes based on different communication environments, for example, based on a communication requirement of service data. In addition, the first communication mode and the second communication mode correspond to respective configuration information. For example, the first communication mode includes the first configuration, and the second communication mode includes the first configuration and the second configuration. Therefore, after the communication mode is switched, the corresponding configuration is used for communication, and each station of the first device does not need to send an operating mode indication (OMI) to change an operating parameter on an operating link of the station. Therefore, not only is a balance achieved between a high rate and low power consumption, but also reduces signaling overheads and a waste of resources. With reference to the first aspect, in some implementations of the first aspect, the first device switches the communication mode after receiving a second message from the second device, where the second message is a response message or an acknowledgment message for the first message.

In an example, the first device switches the communication mode after receiving the response message for the first message. In other words, the first device switches the communication mode after receiving the response message from the second device for the first message, or after determining that the second device agrees on switching of the communication mode.

For still another example, the first device switches the communication mode after receiving the acknowledgment message for the first message. In other words, the first device switches the communication mode after receiving the acknowledgment message for the first message from the second device, or after determining that the second device successfully receives the first message.

Based on the foregoing technical solution, the first device switches the communication mode in response to determining that the second device successfully receives the first message, or in response to determining that the second device agrees the first device to switch the communication mode. In this manner, the first device does not incorrectly switch the communication mode because the second device does not receive the first message or does not agree on switching of the communication mode. Therefore, this avoids degradation of communication performance and a waste of resources caused by incorrect switching of the communication mode.

With reference to the first aspect, in some implementations of the first aspect, in response to the first device switching from the first communication mode to the second communication mode, the first device performs communication by using the second configuration; or the first device switches between the first configuration and the second configuration for communication.

For example, in response to the first device being in the second communication mode, the first device performing communication by using the second configuration.

Based on this solution, the first communication mode and the second communication mode correspond to respective configuration information. For example, the first communication mode includes the first configuration, and the second communication mode includes the second configuration. Therefore, after the communication mode is switched, the corresponding configuration is used for communication, and each station of the first device does not need to send an operating mode indication (OMI) to change an operating parameter on an operating link of the station. Therefore, not only is a balance achieved between a high rate and low power consumption, but also reduces signaling overheads and a waste of resources.

For still another example, in response to the first device being in the second communication mode, the first device switches between the first configuration and the second configuration. A quantity of links enabled under the second configuration is less than a quantity of links enabled under the first configuration. For example, the second configuration enables a single link for communication, and the second configuration enables a plurality of links for communication.

Based on this solution, after entering the second communication mode, the multi-link device (for example, the first device) dynamically switches between a plurality of configurations (for example, the second configuration and the first configuration). A balance is achieved between a high rate and low power consumption.

With reference to the first aspect, in at least one embodiment, in response to the first device switching from the first communication mode to the second communication mode, the first device performs communication by using the second configuration; and the method further includes: After receiving a radio frame from the second device, the first device switches to the first configuration, and transmits data to the second device by using the first configuration.

Optionally, the method further includes: The first device sends a third message to the second device, where the third message indicates the first device to transmit the data to the second device by using the first configuration.

Based on the foregoing technical solution, the first device switches from performing communication by using the second configuration to performing communication by using the first configuration. In addition, after entering the second communication mode (or referred to as a multi-link power save mode), the multi-link device (for example, the first device) dynamically switches between the first configuration and the second configuration. A balance is achieved between a high rate and low power consumption.

With reference to the first aspect, in at least one embodiment, in response to the first device switching from the first communication mode to the second communication mode, the first device performs communication by using the second configuration; and the method further includes: The first device receives information about a third configuration from the second device; and the first device switches to the third configuration based on the information about the third configuration, and transmits data to the second device by using the third configuration.

Optionally, the method further includes: The first device sends a third message to the second device, where the third message indicates the first device to transmit the data to the second device by using the third configuration.

Based on the foregoing technical solution, the first device switches from performing communication by using the second configuration to performing communication by using the third configuration. In addition, the second device recommends, to the first device based on an actual communication requirement, a configuration parameter, namely, the third configuration, for transmitting a data frame. data transmission performance is improved.

With reference to the first aspect, in at least one embodiment, in response to the first device switching from the first communication mode to the second communication mode, the first device performs communication by using the second configuration; and the method further includes: The first device receives information about a third configuration from the second device; and the first device switches to a fourth configuration based on the information about the third configuration, and transmits data to the second device by using the fourth configuration, where the fourth configuration is determined based on the third configuration.

Optionally, the method further includes: The first device sends a third message to the second device, where the third message includes information about the fourth configuration, and the third message indicates the first device to transmit the data to the second device by using the fourth configuration.

Based on the foregoing technical solution, the first device switches from performing communication by using the second configuration to performing communication by using the fourth configuration. In addition, the first device adjusts a parameter configuration of the first device based on a configuration of a data frame subsequently sent by the second device, to avoid using excessive links, spatial steams, and bandwidth. This reduces an energy waste.

With reference to the first aspect, in at least one embodiment, the method further includes: The first device performs communication by using the second configuration after the data transmission ends.

Optionally, the first device performs communication by using the second configuration after data transmission on all links used for transmitting the data is completed; or the first device performs communication by using the second configuration after data transmission on some links used for transmitting the data is completed.

Based on the foregoing technical solution, after the data transmission ends, the first device continues to restore the second configuration for communication, to reduce an energy waste and save energy.

With reference to the first aspect, in at least one embodiment, the data transmission includes: The first device receives a data frame from the second device on T links, where T is an integer greater than 1 or equal to 1; and the method further includes: The data frame received by the first device on each of the T links includes a third field, and the first device determines, based on the third field on each of the T links, whether the data transmission ends; or the data frame includes a fourth field, the fourth field is used to carry control information, and the first device determines, based on the fourth field, whether the data transmission ends.

For example, the third field is a more data field. A more data field in a data frame on a link indicates whether data transmission on the corresponding link ends. The first device determines, based on a more data field on each link used for data transmission, whether the data transmission ends.

For example, the fourth field is a multi-link more data field. The multi-link more data field indicates whether data transmission on the T links ends, and the first device determines, based on the multi-link more data field, whether the data transmission ends.

With reference to the first aspect, in at least one embodiment, the method further includes: The first device sends indication information to a station of the second device, where the indication information includes information about the first configuration or information about the second configuration, and the indication information indicates configuration information of each station on one or more links of the first device.

Based on the foregoing technical solution, configuration information of a plurality of links is indicated by using one piece of signaling. This reduces signaling overheads.

With reference to the first aspect, in at least one embodiment, the first message includes one or more of the following: first information, information about a communication link, and second information; the first information indicates whether the first device switches from the first communication mode to the second communication mode; the information about the communication link indicates a communication link obtained after the communication mode is switched; and the second information indicates whether the first device switches between the first configuration and the second configuration in response to the first device switching from the first communication mode to the second communication mode.

For example, the first information indicates whether the first device switches from the first communication mode to the second communication mode. Alternatively, the first information indicates that a communication mode of the first device is the first communication mode or the second communication mode, the first device switches the communication mode to the second communication mode, or the first device switches the communication mode to the first communication mode.

With reference to the first aspect, in at least one embodiment, the information about the first configuration or the information about the second configuration includes one or more pieces of the following information: an identifier of a link, a number of spatial streams of the link, bandwidth of the link, whether to support uplink multi-user transmission, and whether to support an extended-range transmission mode.

In an example, the information about the first configuration or the information about the second configuration includes the identifier of the link. Therefore, the first device communicates with the second device on the determined link. This improves communication performance.

For still another example, the information about the first configuration or the information about the second configuration includes the number of spatial streams of the link and/or the bandwidth of the link. Therefore, in response to the first device communicating with the second device, communication is performed based on a number of spatial streams of an appropriate link and/or bandwidth of the link. This improves communication performance.

According to a second aspect, a communication mode switching method is provided. The method is performed by a second device, or is performed by a chip, a circuit, or a processing system configured in the second device. This is not limited in embodiments described herein. For example, based on a difference in an integration level, the second device is a device, or is a processing circuit or a processing system in a device. This is not limited in embodiment described herein. The second device is, for example, a multi-link device such as a multi-link access point device.

The method includes: The second device receives a first message from a first device, where the first message is used to notify the second device that the first device switches a communication mode, and the switching a communication mode includes: switching from a first communication mode to a second communication mode, or switching from the second communication mode to the first communication mode; and the second device determines a communication mode to which the first device switches, where the first communication mode includes a first configuration, the second communication mode includes the first configuration and a second configuration, under the first configuration, the first device performs communication on N links, under the second configuration, the first device performs communication on M links, M is an integer greater than 1 or equal to 1, N is an integer greater than 2 or equal to 2, and N is greater than M.

Optionally, the method further includes: The second device communicates with the first device by using a transmission parameter supported by the communication mode to which the first device switches.

Based on the foregoing technical solution, as a multi-link device, the first device dynamically switches between different communication modes. The first device notifies the second device of the communication mode to which the first device switches. In this way, the second device communicates with the first device based on the transmission parameter supported by the communication mode to which the first device switches. Therefore, not only is a balance achieved between a high rate and low power consumption, but also communication performance is ensured between the first device and the second device.

With reference to the second aspect, in at least one embodiment, the second device sends a second message to the first device, where the second message is a response message or an acknowledgment message for the first message.

With reference to the second aspect, in at least one embodiment, the second device determines that the communication mode to which the first device switches is the second communication mode; the second device sends a radio frame to the first device by using a first parameter, where the first parameter is a parameter supported by the second configuration; and the second device receives a third message from the first device, and transmits data to the first device by using a second parameter, where the second parameter is a parameter supported by the first configuration, and the third message indicates the second device to transmit the data by using the first configuration.

With reference to the second aspect, in at least one embodiment, the second device determines that the communication mode to which the first device switches is the second communication mode; the second device sends information about a third configuration to the first device by using a first parameter, where the first parameter is a parameter supported by the second configuration; and the second device receives a third message from the first device, and transmits data to the first device by using a third parameter, where the third parameter is a parameter supported by the third configuration, and the third message indicates the second device to transmit the data by using the third configuration.

With reference to the second aspect, in at least one embodiment, the second device determines that the communication mode to which the first device switches is the second communication mode; the second device sends information about a third configuration to the first device by using a first parameter, where the first parameter is a parameter supported by the second configuration; and the second device receives a third message from the first device, where the third message includes information about a fourth configuration, and the second device transmits data to the first device by using a fourth parameter, where the fourth parameter is a parameter supported by the fourth configuration, and the fourth configuration is determined based on the third configuration.

With reference to the second aspect, in at least one embodiment, the method further includes: The second device receives indication information from the first device, where the indication information includes information about the first configuration or information about the second configuration; and the second device determines configuration information of each station on one or more links of the first device based on the indication information.

With reference to the second aspect, in at least one embodiment, the first message includes one or more of the following: first information, information about a communication link, and second information; the first information indicates whether the first device switches from the first communication mode to the second communication mode; the information about the communication link indicates a communication link obtained after the communication mode is switched; and the second information indicates whether the first device switches between the first configuration and the second configuration in response to the first device being in the second communication mode.

With reference to the second aspect, in at least one embodiment, the information about the first configuration or the information about the second configuration includes one or more pieces of the following information: an identifier of a link, a number of spatial streams of the link, bandwidth of the link, whether to support uplink multi-user transmission, and whether to support an extended-range transmission mode.

According to a third aspect, a configuration indication method applied to multi-link communication is provided, to flexibly configure a link or a spatial stream, and the method is applied to the multi-link communication to reduce energy consumption. The method is performed by a first device, or is performed by a chip or a circuit configured in the first device. This is not limited in this application. For example, due to a difference in an integration level, the first device is a device, or is a part of a device, for example, a chip system or a processing system. This is not limited in this application. The first device is, for example, a multi-link device such as a multi-link station device.

The method includes: The first device sends a configuration frame to a second device, where the configuration frame carries fifth configuration information, and the configuration frame indicates operating mode information of a plurality of links; and the first device receives an acknowledgment frame from the second device, where the acknowledgment frame is an acknowledgment frame for the configuration frame.

According to a fourth aspect, a configuration indication method applied to multi-link communication is provided, to flexibly configure a link or a spatial stream, and the method is applied to the multi-link communication to reduce energy consumption. The method is performed by a second device, or is performed by a chip or a circuit configured in the second device. This is not limited in embodiments described herein. For example, based on a difference in an integration level, the second device is a device, or is a processing circuit or a processing system in a device. This is not limited in embodiments described herein. The second device is, for example, a multi-link device such as a multi-link access point device.

The method includes: The second device receives a configuration frame from a first device, where the configuration frame carries fifth configuration information, and the configuration frame indicates operating mode information of a plurality of links; and the second device sends an acknowledgment frame for the configuration frame to the first device, and transmits data to the first device by using a fifth parameter, where the fifth parameter is a parameter supported by the fifth configuration information.

Based on the foregoing technical solution, the multi-link device (for example, the first device) flexibly changes a radio frequency chain configuration of the multi-link device based on a requirement. For example, the first device selects a relatively optimal configuration or an optimal configuration, namely, the fifth configuration, and then send the fifth configuration information to the second device. Therefore, a radio frequency chain resource is flexibly configured, a radio frequency chain is properly used, and resource utilization is improved.

With reference to the third aspect, in at least one embodiment, the method further includes: After receiving the acknowledgment frame, the first device transmits data to the second device by using a fifth parameter, where the fifth parameter is a parameter supported by the fifth configuration information.

With reference to the third aspect or the fourth aspect, in some implementations, the operating mode information includes a number of spatial streams of a link.

Optionally, the operating mode information further includes bandwidth of the link, whether to support uplink multi-user transmission, and whether to support an extended-range transmission mode.

Based on the foregoing technical solution, the multi-link device (for example, the first device) flexibly selects the number of spatial streams of the link based on a requirement. In addition, information about the operating mode information is notified to the second device, for example, spatial streams of links of the second device are notified, or bandwidth of the links is further notified. In this way, the second device performs communication based on the determined communication parameter.

With reference to the third aspect or the fourth aspect, in some implementations, a frame structure of the fifth configuration information includes a spatial stream SS allocation SS field and a link identifier ID field, and the SS allocation field is used to carry allocation information of a spatial stream.

The SS allocation field is used to carry the allocation information of the spatial stream. In other words, the SS allocation field carries allocation information of all spatial streams allocated to all links.

The link ID field carries identification information of the link, that is, indicate the links to which the spatial streams are allocated.

Based on the foregoing technical solution, information about the link allocated to the spatial stream is learned.

With reference to the third aspect or the fourth aspect, in at least one embodiment, a frame structure of the fifth configuration information includes an SS allocation field and a link bitmap field, and the SS allocation field is used to carry allocation information of a spatial stream.

The SS allocation field is used to carry the allocation information of the spatial stream. In other words, the SS allocation field carries allocation information of all spatial streams allocated to all links.

The link bitmap field indicates the links to which the spatial streams are allocated.

Based on the foregoing technical solution, the links to which the spatial streams are allocated is learned by using a bitmap.

With reference to the third aspect or the fourth aspect, in at least one embodiment, a frame structure of the fifth configuration information includes a link ID field and a number of spatial streams NSS field, and the link ID field and the NSS field respectively indicate an identifier of a link and a number of allocated spatial streams.

According to a fifth aspect, a communication apparatus is provided, configured to perform the method in at least one embodiment. Specifically, the apparatus includes a unit configured to perform the method in at least one embodiment.

According to a sixth aspect, another communication apparatus is provided, including a processor. The processor is coupled to a memory, and is configured to execute instructions in the memory, to implement the method in at least one embodiment of the first aspect to the fourth aspect. The memory is an on-chip storage unit inside the processor, or is an off-chip storage unit that is coupled to the memory and that is located outside the processor. In at least one embodiment, the apparatus further includes a memory. In at least one embodiment, the apparatus further includes a communication interface, and the processor is coupled to the communication interface.

In at least one embodiment, the communication apparatus is a first device (for example, a multi-link device such as a multi-link station device), is a chip, a circuit, or a processing system configured in the first device, or is a device including the first device.

In at least one embodiment, the communication apparatus is a second device (for example, a multi-link device such as a multi-link access point device), is a chip, a circuit, or a processing system configured in the second device, or is a device including the second device.

In an implementation, the apparatus is a first device or a device including the first device. In response to the apparatus being the first device or the device including the first device, the communication interface is a transceiver or an input/output interface. Optionally, the transceiver is a transceiver circuit.

In another implementation, the apparatus is a chip configured in a first device. In response to the apparatus being the chip configured in the first device, the communication interface is an input/output interface, an interface circuit, an output circuit, an input circuit, a pin, a related circuit, or the like. The processor is also embodied as a processing circuit or a logic circuit.

In still another implementation, the apparatus is a second device or a device including the second device. In response to the apparatus being the second device or the device including the second device, the communication interface is a transceiver or an input/output interface. Optionally, the transceiver is a transceiver circuit.

In yet another implementation, the apparatus is a chip configured in a second device. In response to the apparatus being the chip configured in the second device, the communication interface is an input/output interface, an interface circuit, an output circuit, an input circuit, a pin, a related circuit, or the like. The processor is also embodied as a processing circuit or a logic circuit.

According to a seventh aspect, a computer-readable storage medium is provided. The computer readable-storage medium stores a computer program, and in response to the computer program being executed by a communication apparatus, the communication apparatus is enabled to implement the method in at least one embodiment.

According to an eighth aspect, a computer program product including instructions is provided. In response to the instructions being executed by a computer, a communication apparatus is enabled to implement the method in at least one embodiment.

According to a ninth aspect, a communication system is provided, including the foregoing first device and the foregoing second device.

BRIEF DESCRIPTION OF DRAWINGS

FIG. 4 and FIG. 5 are schematic diagrams of frame structures of a communication mode switching method according to at least one embodiment;

FIG. 6 is a schematic interaction diagram of a communication mode switching method according to at least one embodiment;

FIG. 13 is a schematic diagram of a frame structure of a configuration frame according to at least one embodiment;

FIG. 14 is a schematic diagram of still another frame structure of a configuration frame according to at least one embodiment;

FIG. 15 is a schematic diagram of an SS allocation field according to at least one embodiment;

FIG. 16 is a schematic diagram of another frame structure of a configuration frame according to at least one embodiment;

FIG. 17 is a schematic block diagram of a communication apparatus according to at least one embodiment;

DESCRIPTION OF EMBODIMENTS

The following describes technical solutions with reference to accompanying drawings.

Embodiments described herein provide a communication method applied to a wireless communication system, to reduce power consumption of a multi-link device. The wireless communication system is a wireless local area network or a cellular network. The method is implemented by a communication device in the wireless communication system or a chip or a processor in the communication device. The communication device is a wireless communication device, for example, referred to as a multi-link device (MLD), that supports parallel transmission on a plurality of links. Compared with a device that supports only single-link transmission, the multi-link device has higher transmission efficiency and a higher throughput.

The multi-link device includes one or more affiliated stations (STA) (affiliated STAs), and the affiliated STA works on one or more links. The affiliated station is an access point (AP) station or a non-access point station (non-AP STA). For example, one multi-link device includes a plurality of affiliated STAs, and one affiliated STA separately works on one of a plurality of links. Another multi-link device includes one or more affiliated STAs, where one affiliated STA works on one link or switches to work on a plurality of links. For ease of description, “a multi-link device includes an affiliated STA” is briefly described as “a multi-link device includes a STA” in embodiments described herein. For ease of description, in embodiments described herein, a multi-link device whose affiliated station is an AP is referred to as a multi-link AP, a multi-link AP device, or a multi-link access point device; and a multi-link device whose affiliated station is a non-AP STA is referred to as a multi-link STA, a multi-link STA device, or a multi-link station device.

For ease of understanding of embodiments described herein, a communication system is first described in detail with reference to FIG. 1.

Figure 1:
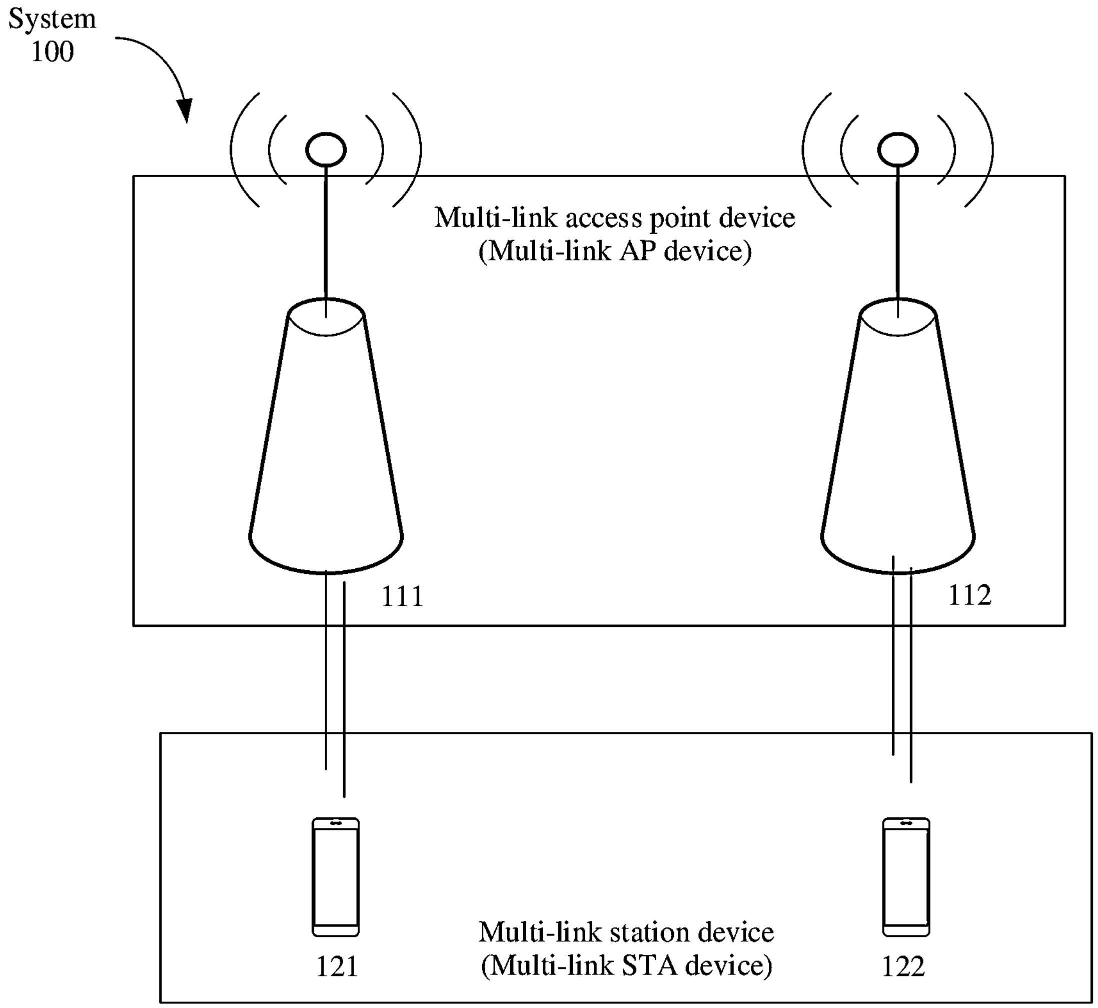
FIG. 1 is a schematic diagram of a communication system according to at least one embodiment.

FIG. 1 is another schematic diagram of a wireless communication system 100 according to at least one embodiment. As shown in FIG. 1, the technical solution according to at least one embodiment is applied to a wireless local area network, and the wireless communication system 100 includes at least one multi-link device. The multi-link device is a multi-link access point device, or is a multi-link station device. In response to being the multi-link access point device, the device includes one or more APs. In response to being the multi-link station device, the device includes one or more non-access point stations (non-AP STAs). The one or more non-AP STAs in the station device communicates with the one or more APs in the access point device after an association relationship is established between the one or more non-AP STAs and the one or more APs.

For example, the wireless communication system 100 shown in FIG. 1 includes at least one multi-link access point device (AP multi-link device, AP MLD) and at least one multi-link station device (or referred to as a multi-link non-access point device (Non-AP multi-link device, non-AP MLD)). The multi-link access point device includes, for example, an AP 111 and an AP 112, and the multi-link station device includes, for example, a STA 121 and a STA 122. The AP 111 communicates with the STA 121. For example, the AP 111 communicates with the STA 121 after an association relationship is established between the AP 111 and the STA 121. The AP 112 communicates with the STA 122. For example, the AP 112 communicates with the STA 122 after an association relationship is established between the AP 112 and the STA 122.

In at least one embodiment, a first device is, for example, the multi-link station device, and includes, for example, the STA 121 and the STA 122. A second device is, for example, the multi-link access point device, and includes, for example, the access point device 111 and the access point device 112.

It should be understood that the foregoing communication system according to at least one embodiment described with reference to FIG. 1 is merely an example for description, and the communication system according to at least one embodiment is not limited thereto. For example, a quantity of APs and a quantity of STAs included in the communication system alternatively is another quantity.

The multi-link device is an apparatus having a wireless communication function, and implements wireless communication in compliance with the 802.11 series protocols, for example, support an extremely high throughput (EHT) station, or support 802.11be or be compatible with 802.11be. Certainly, the multi-link device is further compatible with and support another protocol, for example, 802.11a/b/g/n/an, or the like. For example, the multi-link device is a device, or is a chip, a processing system, or the like installed on the device. The device on which the chip or the processing system is installed implements methods and functions in embodiments described herein under control of the chip or the processing system.

The multi-link STA device in at least one embodiment is a device having a wireless transceiver function, for example, supports the 802.11 series protocols, and communicates with the multi-link AP, another multi-link STA, or a single-link device. For example, the multi-link STA is any user communication device that allows a user to communicate with an AP and then with the WLAN. The multi-link STA device is, for example, user equipment (UE), a mobile station (MS), a mobile terminal (MT), a STA, an access terminal, a subscriber unit, a subscriber station, a mobile station, a remote station, a remote terminal, a mobile device, a user terminal, a terminal, a wireless communication device, a user agent, a user apparatus, or the like.

The multi-link STA in at least one embodiment further is a device that provides a user with voice/data connectivity, for example, a hand-held device or vehicle-mounted device having a wireless connection function. For example, the multi-link STA is a mobile phone, a tablet computer, a notebook computer, a palmtop computer, a mobile Internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a hand-held device having a wireless communication function, a computing device or another processing device connected to a wireless modem, a vehicle-mounted device, a wearable device, a terminal device in a 5G network, or a terminal device in a future evolved public land mobile network (PLMN). This is not limited in embodiments described herein.

As an example rather than a limitation, in at least one embodiment, the multi-link STA device alternatively is a wearable device. The wearable device is also referred to as a wearable intelligent device, and is a general term of a wearable device that is intelligently designed and developed for daily wear by using a wearable technology, for example, glasses, gloves, a watch, clothing, and shoes. For example, smart watches or smart glasses, and devices that focus on only one type of application function work with other devices such as smartphones, such as various smart bands or smart jewelry for monitoring physical signs.

Alternatively, in at least one embodiment, the multi-link STA device is a terminal device in an Internet of things (IoT) system. IoT is an important composition part of information technology development in the future, and has a main technical feature in which things are connected to a network by using a communication technology to implement a man-machine connected and thing-thing connected intelligent network. In embodiments described herein, an IoT technology implements massive connections, deep coverage, and terminal power saving by using, for example, a narrowband (narrow band, NB) technology.

In addition, in at least one embodiment, the multi-link STA device is a device in an Internet of vehicles system. Communication modes in an Internet of vehicles system are collectively referred to as V2X (X indicates everything) communication. For example, the V2X communication includes vehicle-to-vehicle (vehicle to vehicle, V2V) communication, vehicle-to-infrastructure (vehicle to infrastructure, V2I) communication, vehicle-to-pedestrian (vehicle to pedestrian, V2P) communication, or vehicle-to-network (vehicle to network, V2N) communication.

In addition, in at least one embodiment, the multi-link STA device further includes a sensor such as an intelligent printer, a train detector, or a gas station. Main functions of the multi-link STA device include collecting data (by some terminal devices), receiving control information and downlink data of the multi-link AP device, sending an electromagnetic wave, and transmitting uplink data to the multi-link AP device.

In addition, the multi-link AP device in at least one embodiment is a device configured to communicate with the multi-link STA device. The multi-link AP device is a network device in the wireless local area network, and the multi-link AP device is configured to communicate with the multi-link STA device by using the wireless local area network.

The multi-link AP device in at least one embodiment is a device in a wireless network. For example, the multi-link AP device is a communication entity such as a communication server, a router, a switch, or a network bridge, or the multi-link AP device includes various forms of macro base stations, micro base stations, relay stations, or the like. Certainly, the multi-link AP further is a chip, a circuit, or a processing system in the various forms of devices, to implement the methods and functions of embodiments described herein. The multi-link device supports high-rate and low-latency transmission. With continuous evolution of wireless local area network application scenarios, the multi-link device is further applied to more scenarios, for example, serving as a sensor node (for example, a smart water meter, a smart electricity meter, or a smart air detection node) in a smart city, a smart device (for example, a smart camera, a projector, a display screen, a television, a stereo, a refrigerator, or a washing machine) in a smart home, a node in Internet of things, an entertainment terminal (for example, AR, VR, or another wearable device), a smart device (for example, a printer, or a projector) in a smart office, an Internet of vehicles device in Internet of vehicles, or infrastructure (for example, a vending machine, a self-service navigation console, a self-checkout device, or a self-service food machine) in daily life scenarios.

The multi-link STA device and the multi-link AP device are not specifically limited in embodiments described herein, and are merely examples for description herein.

A specific structure of an execution body of a method provided in at least one embodiment is not specifically limited in embodiments described herein provided that a program that records code for the method provided in at least one embodiment is run to perform communication according to the method provided in at least one embodiment. For example, the execution body of the method provided in at least one embodiment is the multi-link AP device, the multi-link STA device, or a functional module that invokes and executes a program in the multi-link AP device or the multi-link STA device.

In addition, a computer-readable medium includes but is not limited to: a magnetic storage component (for example, a hard disk, a floppy disk, or a magnetic tape), an optical disc (for example, a compact disc (CD), a digital versatile disc (DVD), or the like), and a smart card and a flash memory component (for example, an erasable programmable read-only memory (EPROM), a card, a stick, a key drive, or the like). In addition, various storage media described in this specification indicates one or more devices and/or other machine-readable media that are configured to store information. The term "machine-readable media" includes but is not limited to a wireless channel, and various other media that stores, includes, and/or carries instructions and/or data.

For ease of understanding of embodiments described herein, the following first briefly describes several terms.

1. Spatial Multiplexing

With application of a multiple-input multiple-output (MIMO) technology, a communication receiver and a communication transmitter establishes communication channels that are spatially independent of each other by using a plurality of antennas, and transmits different data content on these channels, to implement spatial multiplexing (SM).

2. Multi-Link Communication

With development of wireless technologies, increasingly more wireless devices support multi-link communication. For example, a device simultaneously performs communication on a plurality of frequency bands, for example, simultaneously perform communication on frequency bands of 2.4 gigahertz (GHz), 5 GHz, and 6 GHz; or a device simultaneously performs communication on different channels in a same frequency band. A communication rate between devices is improved. The device is also referred to as a multi-link device, for example, the multi-link access point device and the multi-link station device in the system 100 described above.

The multi-link device and the multi-link communication are merely names, and do not limit the protection scope of embodiments described herein. Names indicating a same meaning or a same function in a future protocol falls within the protection scope of embodiments described herein.

For example, the multi-link device includes one or more station devices such as the STA 121 and the STA 122 shown in FIG. 1. A STA is used as an example. A STA works on a specific frequency band or channel.

Figure 2:
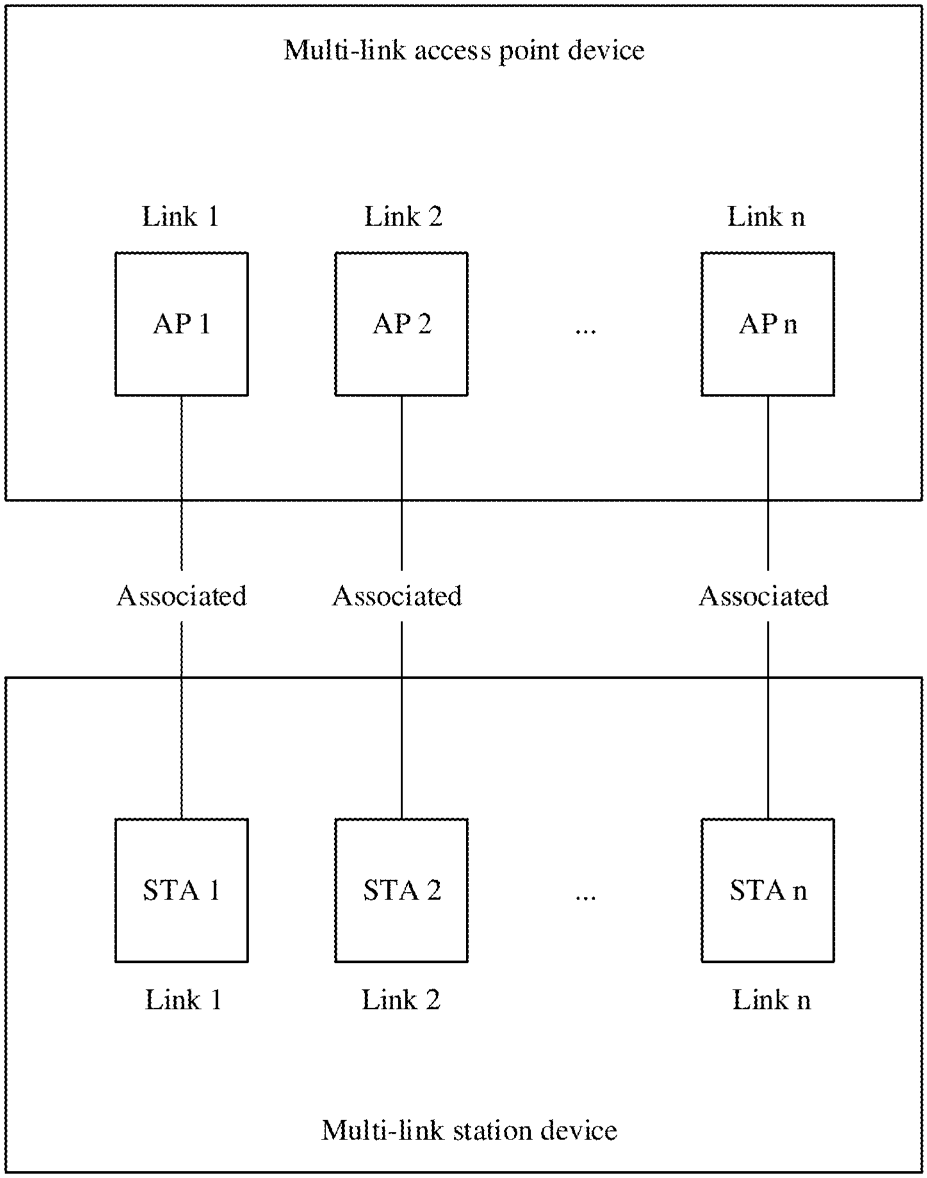
FIG. 2 is a schematic diagram of multi-link communication.

The multi-link device is an access point device, or a station device. In response to the multi-link device being the access point device, the multi-link device includes one or more APs. In response to the multi-link device being the station device, the multi-link device includes one or more STAs (or referred to as non-AP STAs). As shown in FIG. 2, the one or more STAs (or referred to as the non-AP STAs) in the station device communicates with the one or more APs in the access point device after an association relationship is established between the one or more STAs and the one or more APs.

As shown in FIG. 2, the multi-link station device includes a STA 1, a STA 2, . . . , and a STA n, and the multi-link access point device includes an AP 1, an AP 2, . . . , and an AP n, where n is an integer greater than or equal to 1. For example, the STA 1 communicates with the AP 1 after establishing an association with the AP 1, for example, a link 1 in FIG. 2. For another example, the STA 2 communicates with the AP 2 after establishing an association with the AP 2, for example, a link 2 in FIG. 2. For another example, the STA n communicates with the AP n after establishing an association with the AP n, for example, a link n in FIG. 2.

Similar to spatial multiplexing, in the multi-link communication, a communication rate is improved by using more antennas and more radio frequency (RF) chains (RF chains). However, more antennas and more radio frequency chains cause higher energy consumption.

In view of this, at least one embodiment provides a method, to properly allocate antennas and radio frequency chain resources in the multi-link communication. This achieves a balance between a high rate and low power consumption.

The following describes in detail embodiments provided in at least one embodiment with reference to the accompanying drawings.

Figure 3:
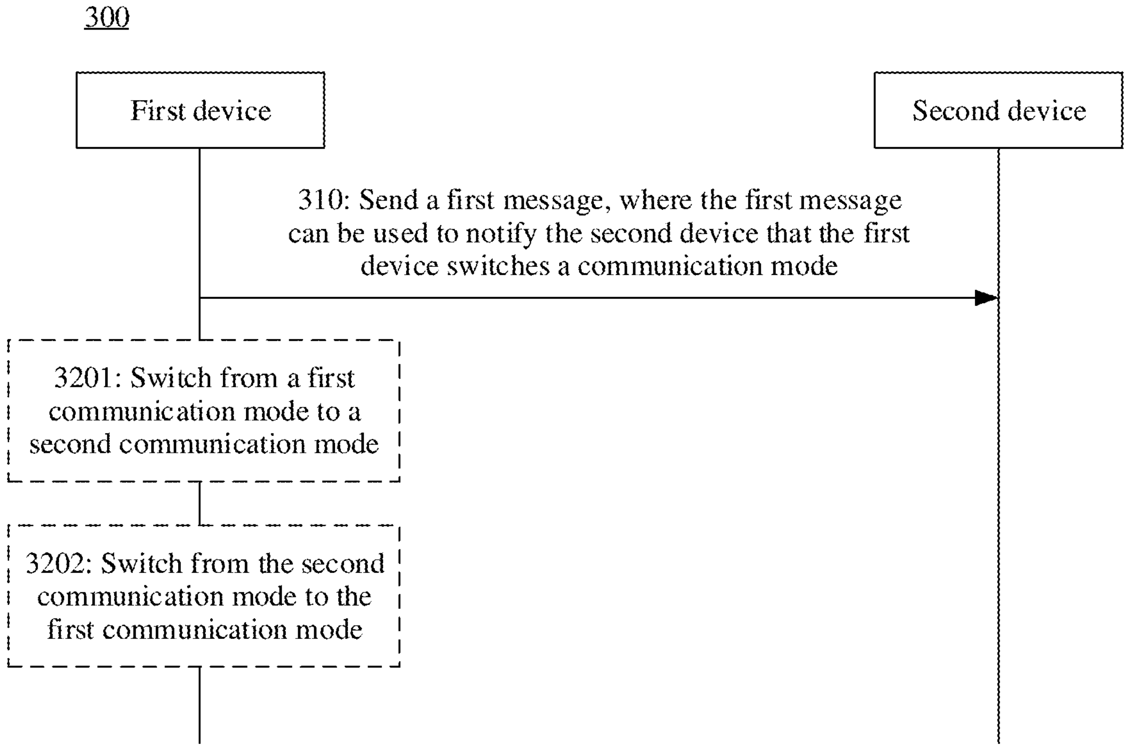
FIG. 3 is a schematic block diagram of a communication mode switching method according to at least one embodiment.

FIG. 3 is a schematic interaction diagram of a communication method 300 according to at least one embodiment. The method 300 includes the following steps.

310: A first device sends a first message to a second device, where the first message is used to notify the second device that the first device switches a communication mode. Correspondingly, the second device receives the first message.

In response to wanting to switch the communication mode, the first device sends the first message to the second device. A notification indicates that the first device notifies the second device that the first device needs to switch the communication mode; or the notification indicates that the first device requests to the second device that the first device needs to switch the communication mode.

The first message is merely a general name. For example, the first message is also referred to as a mode conversion message or a mode conversion frame, and the name of the first message does not limit the protection scope of embodiments described herein. Names indicating a same function in a future protocol all fall within the protection scope of embodiments described herein.

The following describes the first message in detail.

Optionally, the switching a communication mode includes switching from a first communication mode to a second communication mode, or the switching a communication mode includes switching from the second communication mode to the first communication mode.

For example, the first device sends the first message to the second device, where the first message is used to notify the second device that the first device switches the communication mode to the second communication mode. For example, after sending the first message to the second device, the first device enters the second communication mode. For another example, after receiving a second message from the second device, the first device enters the second communication mode.

For still another example, the first device sends the first message to the second device, where the first message is used to request to the second device that the first device switches the communication mode to the first communication mode. For example, after sending the first message to the second device, the first device enters the first communication mode. For another example, after receiving a second message from the second device, the first device enters the first communication mode. In this manner, the second device does not incorrectly switch the communication mode in response to the second device not receiving the first message or fails to receive the first message.

The second message is an acknowledgment message, namely, an acknowledgment message for the first message (or an acknowledgment message of the first message). In other words, after receiving the first message, the second device sends the acknowledgment message to the first device, to indicate that the second device has received the first message. Alternatively, the second message is a response message, namely, a response message for the first message (or a response message for the first message). In other words, after receiving the first message, the second device sends the response message to the first device, to indicate that the first device switches the communication mode.

Optionally, the method 300 further includes step 3201 or step 3201.

3201: The first device switches from the first communication mode to the second communication mode.

Therefore, the following describes a method 600 with reference to FIG. 6.

3202: The first device switches from the second communication mode to the first communication mode.

Figure 7:
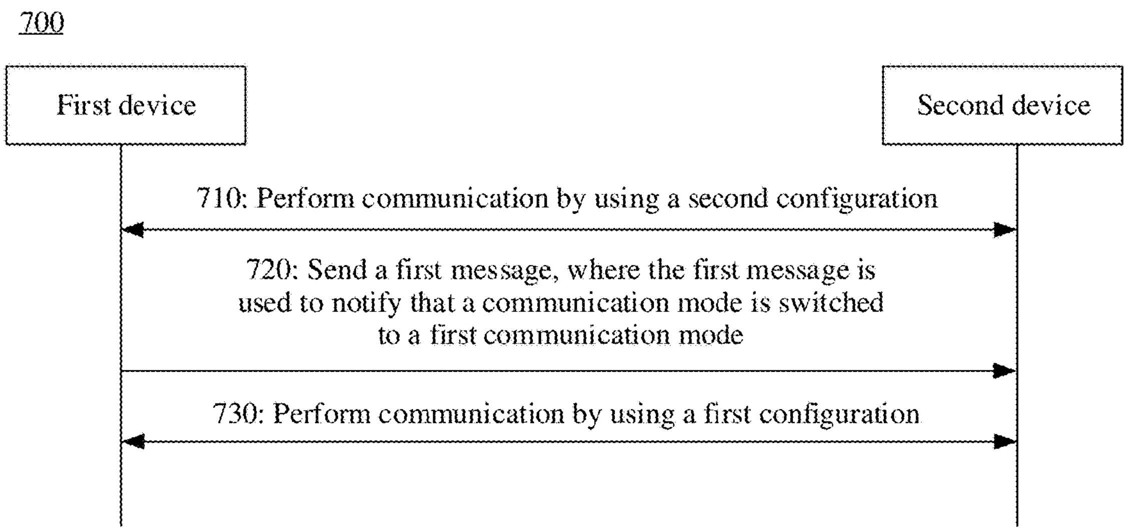
FIG. 7 is a schematic interaction diagram of a communication mode switching method according to at least one embodiment.

Therefore, the following describes a method 700 with reference to FIG. 7.

The first communication mode and the second communication mode are merely names for differentiation, and the names do not limit the protection scope of embodiments described herein. Names indicating a same function in a future protocol all fall within the protection scope of embodiments described herein. For example, the first communication mode is referred to as a multi-link active mode (or referred to as an active mode), a multi-link conventional communication mode, or a multi-link communication mode. For another example, the second communication mode is referred to as a multi-link power save communication mode, a multi-link communication power save mode, or a multi-link spatial multiplexing power save mode (multi-link sm power save mode). Generally, embodiments described here uses the first communication mode and the second communication mode.

In at least one embodiment, the first communication mode includes a first configuration, and the second communication mode includes a second configuration. To be specific, in the first communication mode, the first device performs communication by using the first configuration. In the second communication mode, the first device performs communication by using the second configuration.

In at least one embodiment, the first communication mode includes a first configuration, and the second communication mode includes a second configuration and the first configuration. To be specific, in the first communication mode, the first device performs communication by using the first configuration. In the second communication mode, the first device performs communication by using the second configuration, or performs communication by using the first configuration.

In at least one embodiment, after entering the second communication mode, the first device switches between the first configuration and the second configuration. A balance is achieved between a high rate and low power consumption, and improve overall system performance. The following describes in detail a solution in which after entering the second communication mode, the first device switches between the first configuration and the second configuration.

A communication resource corresponding to the first configuration is greater than a communication resource corresponding to the second configuration. In other words, the first device using the second configuration for communication is more power save than the first device using the first configuration for communication. The communication resource includes, for example, a link (link), a number of spatial streams (NSS), bandwidth (band width, BW), or the like.

Optionally, under the first configuration, the first device performs communication on N links, under the second configuration, the first device performs communication on M links, M is an integer greater than 1 or equal to 1, N is an integer greater than 2 or equal to 2, and N is greater than M.

In other words, under the first configuration, the first device is supported to perform communication on the N links; and under the second configuration, the first device is supported to perform communication on the M links.

Under the first configuration, the first device works on two or more links, and performs communication on each link by using one or more radio frequency chains. Under the second configuration, the first device works on one or more links, and performs communication on each link by using one or more radio frequency chains.

In at least one embodiment, the first configuration corresponds to a plurality of links, and the second configuration corresponds to a single link. In other words, under the first configuration, the first device works on the plurality of links; and under the second configuration, the first device works on the one link. In response to a transmission service amount being large, a plurality of links is used for communication, to improve a communication rate and reduce a communication latency. A specific quantity of links used for multi-link communication is further determined based on an actual service requirement. In response to a transmission service amount being small, only a single link is used for communication, to reduce an energy loss. This achieves a balance between a high rate and low power consumption.

In at least one embodiment, as a multi-link device, the first device dynamically switches between different communication modes. For example, the first device dynamically switches between different communication modes based on different communication environments, for example, based on a communication requirement of service data. In addition, the first communication mode and the second communication mode correspond to respective configuration information. For example, the first communication mode includes the first configuration, and the second communication mode includes the first configuration and the second configuration. Therefore, after the communication mode is switched, the corresponding configuration is used for communication, and each station of the first device does not need to send an operating mode indication (OMI) to change an operating parameter on an operating link of the station. Therefore, not only is a balance achieved between a high rate and low power consumption, but also signaling overheads and a waste of resources are reduced.

Optionally, the first configuration or the second configuration includes one or more communication parameters.

For example, the communication parameter includes a link ID. By using the link ID, the first device determines a communication link, or in other words, determining a link on which communication is performed, to perform communication on the determined link. This improves communication performance. In addition, the communication parameters further includes a number of spatial streams of the link, bandwidth of the link, whether to support uplink multi-user transmission, and whether to support an extended-range transmission mode. The first device performs communication based on the communication parameters.

The following describes manners of determining the first configuration and the second configuration.

(1) First Configuration

Manner 1: One or more stations of the first device separately send information about the first configuration to one or more stations of the second device.

In other words, the one or more stations of the first device separately send the configuration information to the one or more stations of the second device, to separately indicate an operating parameter of each station of the first device.

Manner 2: One station of the first device sends information about the first configuration to one station of the second device.

In other words, the one station of the first device sends the configuration information to the one station of the second device, to indicate an operating parameter of each station on the plurality of links of the first device.

The operating parameter includes the link ID. In addition, operating parameters further include operating bandwidth, an NSS, whether to support uplink multi-user transmission, and whether to support an extended-range transmission mode.

For example, the first configuration is carried in existing signaling. For example, the first configuration is carried in an OMI control information field, or carried in an extremely high throughput (EHT) operation element (EHT operation element).

(2) Second Configuration

Manner 1: The second configuration is a fixed configuration.

In other words, the second configuration is a pre-specified configuration, for example, predefined in a protocol. For example, the second configuration corresponds to a single link, a single stream, and fixed bandwidth (for example, 20 megahertz (Mega Hertz, MHz) bandwidth).

Manner 2: One or more stations of the first device separately send information about the second configuration to one or more stations of the second device.

Manner 3: One station of the first device sends information about the second configuration to one station of the second device.

The following describes in detail a solution in which the first device indicates operating parameters (or configuration information) of the plurality of links by using one piece of signaling.

The following describes the first message in detail from two aspects.

Aspect 1: Information that is included in the first message.

Optionally, the first message includes one or more of the following: first information, information about a communication link, and second information. Description is separately provided below.

1. First Information.

The first information indicates whether the first device switches the communication mode or whether the first device switches from the first communication mode to the second communication mode. For example, a first field of the first message carries the first information. Different values of the first field indicates whether the first device switches the communication mode.

The values of the first field is a first value and a second value, and the first value and the second value are different. For example, the first value is 0, and the second value is 1; or the first value is 1, and the second value is 0.

In response to a value of the first field being the first value, the first device switches the communication mode; or in response to a value of the first field being the second value, the first device does not switch the communication mode, that is, continues to maintain a current communication mode. The current communication mode of the first device is the first communication mode.

The second device is used as an example. The second device determines, based on the value of the first field, whether the first device needs to switch the communication mode. For example, in response to the value of the first field being the first value, the first device switches the communication mode, that is, the first device enters the second communication mode. In response to the value of the first field being the second value, the first device does not switch the communication mode, that is, the first device continues to perform communication in the first communication mode.

The first device is used as an example. The first device determines the value of the first field based on whether to switch the communication mode. For example, in response to the first device switching the communication mode, in the first message sent by the first device to the second device, the value of the first field is the first value, and the first value is used to notify the second device that the first device switches the communication mode to the second communication mode. In response to the first device not switching the communication mode, in the first message sent by the first device to the second device, the value of the first field is the second value, and the second value is used to notify the second device that the first device does not switch the communication mode, that is, the first device continues to perform communication in the first communication mode.

The foregoing is merely an example for description, and embodiments described herein are not limited thereto. For example, in response to the first device not switching the communication mode, the first device does not send the first message to the second device.

Specific content indicated by the first field is not limited in embodiments described herein, provided that the second device learns, by using the first field, of a communication mode in which the first device expects to perform communication. This falls within the protection scope of embodiments described herein.

2. Information about a Communication Link.

The information about the communication link indicates a communication link obtained after the communication mode is switched. For example, the information about the communication link includes an identifier (ID) of the communication link. A link ID field carries the information about the communication link.

For example, a current communication mode of the first device is the first communication mode, and communication links of the first device include a link 1 and a link 2. In response to the first device sending the first message to the second device to notify the first device to switch from the first communication mode to the second communication mode, and the first message includes an ID of the link 2, the second device determines, based on the first message, that the first device is to switch the communication mode to the second communication mode, and after switching to the second communication mode, performs communication by using the link 2.

3. Second Information.

The second information indicates whether the first device switches between a plurality of configurations in the second communication mode, for example, in the second communication mode, whether the first device switches between the first configuration and the second configuration.

The following describes the second information in detail.

The foregoing describes the information that is included in the first message. the first message further includes more information. This is not limited in embodiments described herein. In addition, a name of each piece of information is not limited in embodiments described herein. The following describes a frame structure applicable to the first message.

Aspect 2: The frame structure applicable to the first message.

A specific form of the first message is not limited in at least one embodiment. With reference to frame structures shown in FIG. 4 and FIG. 5, the following describes, by using an example, a frame structure applicable to the first message.

In at least one embodiment, the first message is transmitted by using an EHT action frame, which is, for example, referred to as a mode switching frame. A frame structure of the EHT action frame is shown in FIG. 4.

Figure 4:
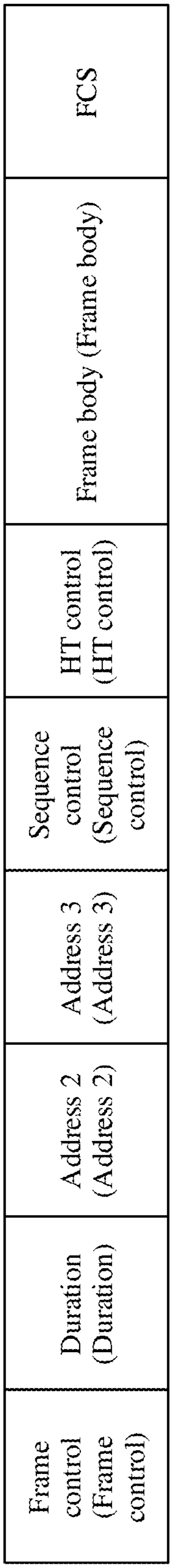

As shown in FIG. 4, the frame structure includes, for example, but is not limited to a frame control field, a duration field, an address (for example, an address 2 and an address 3) field, a sequence control field, a high throughput control (HT control) field, a frame body field, and a frame check sequence (FCS) field.

For example, the frame body includes one or more pieces of information. For example, the frame body includes information shown in the following Table 1.

TABLE 1

| Order (order) | Information (information) |
|---|---|
| 1 | Category (category) |
| 2 | EHT action |
| 3 | Control #A field (control field) |

Content of Table 1 is merely an example, and embodiments described herein are not limited thereto. For example, the frame body further includes more content.

Names of the foregoing pieces of information are merely used to distinguish between different functions, and do not limit the protection scope of embodiments described herein. Names indicating a same function in a future protocol all fall within the protection of embodiments described herein. For example, the control #A field is also referred to as an ML spatial multiplexing (SM) power save (ML SM power save) control field.

The first information, the information about the communication link, and the second information in the first message all are carried in the control field #A.

FIG. 5 shows a frame structure of the control field #A. As shown in FIG. 5, the frame structure of the control #A field includes a first field. Optionally, the frame structure of the control #A field further includes but is not limited to a second field and a link ID field.

The first field is also referred to as, for example, a mode enabled field or an ML SM power save mode enabled field. A name of the first field does not limit the protection of embodiments described herein. Different values of the first field indicates whether the first device needs to switch the communication mode. For example, in response to a value of the first field being 1, the first device switches the communication mode; or in response to a value of the first field being 0, the first device does not switch the communication mode, that is, still uses a current communication mode.

For example, the current communication mode of the first device is the first communication mode. In response to the value of the first field being 1, the first device enters the second communication mode. In response to the value of the first field being 0, the first device does not switch the communication mode, that is, the first device continues to communicate with the second device in the first communication mode.

The link ID field is also referred to as, for example, a link field, and a name of the link ID field does not limit the protection of embodiments described herein. The link ID field is used to carry information about a communication link. Optionally, in response to the first device continuing to perform communication in the current communication mode, the first device still performs communication by using a current communication link. In this case, the link ID field does not carry the information about the communication link. For example, the link ID field is used as a reserved field.

The second field is also referred to as, for example, a dynamic field, and a name of the second field does not limit the protection of embodiments described herein. The second field is used to carry the second information. For example, in response to a value of the second field being 0, in the second communication mode, the first device does not switch between the plurality of configurations; or in the second communication mode, the first device performs communication only by using the second configuration. For another example, in response to the value of the second field being 1 in the second communication mode, the first device switches between the plurality of configurations.

The frame structures shown in FIG. 4 and FIG. 5 are merely examples for description, and any variation belonging to the structures falls within the protection of embodiments described herein. For example, in the frame structure shown in FIG. 5, the frame structure of the control #A field further includes more fields.

For ease of understanding, the following describes a communication mode switching procedure with reference to two scenarios.

Scenario 1: The first device switches from the first communication mode to the second communication mode.

The following provides an example for description with reference to FIG. 6.

FIG. 6 is a schematic interaction diagram of a communication method 600 applicable to at least one embodiment. The method 600 includes the following steps.

610: The first device communicates with the second device by using a first configuration.

In other words, in the first communication mode, the first device communicates with the second device by using the first configuration.

620: The first device sends a first message to the second device, where the first message is used to notify that a communication mode is switched to the second communication mode.

For the first message, refer to the description in the foregoing method 300. Details are not described herein again.

The frame structure shown in FIG. 5 is used as an example. the value of the first field is 1 to indicate that the first device switches the communication mode; and that the value of the first field is 0 to indicate that the first device does not switch the communication mode, that is, still uses a current communication mode.

In the scenario 1, the value of the first field is 1. After receiving the first message, the second device determines, based on that the first field being 1, that the first device switches the communication mode to the second communication mode.

630: The first device communicates with the second device by using the second configuration.

In other words, after entering the second communication mode, the first device communicates with the second device by using the second configuration.

In at least one embodiment, after sending the first message to the second device, the first device enters the second communication mode; and after receiving the first message from the first device, the second device enters the second communication mode.

In at least one embodiment, after receiving a second message, the first device enters the second communication mode; and after sending the second message to the first device, the second device enters the second communication mode. For example, after receiving the first message from the first device, the second device sends an acknowledgment message for the first message to the first device, that is, confirm that the first device enters the second communication mode. For another example, after the receiving the first message from the first device, the second device sends a response message for the first message to the first device, that is, the first device enters the second communication mode.

In at least one embodiment, the first device disables an unnecessary link in response to a communication service requirement being low, and reduce a number of spatial streams of the link to a minimum, to achieve a power save objective.

Optionally, in the second communication mode, the first device always performs communication by using the second configuration, or switches between a plurality of configurations (for example, the first configuration and the second configuration). The following describes in detail a case in which switching is performed between the first configuration and the second configuration.

Optionally, the method 600 further includes step 601 to step 605.

601: The first device performs communication by using the second configuration.

602: The second device sends a radio frame to the first device by using a first parameter.

For example, in response to the second device transmitting data to the first device, the second device sends the radio frame to the first device by using the first parameter. The first device determines, by using the radio frame, that the second device is to transmit the data to the first device.

In at least one embodiment, the first parameter indicates a parameter supported by the second configuration. In other words, the second device sends the radio frame to the first device by using the parameter supported by the second configuration.

In at least one embodiment, in response to a parameter being a parameter supported by a configuration, for example, the first parameter is a parameter supported by the second configuration, a link of the parameter is a subset of links of the configuration, a number of spatial streams of each link of the parameter is less than or equal to a number of spatial streams of a corresponding link of the configuration, or bandwidth on each link of the parameter is less than or equal to bandwidth on a corresponding link of the configuration. This is not described in the following again.

603: The first device switches to the first configuration.

Optionally, before receiving the radio frame and switching to the first configuration, the first device sends a third message to the second device. The third message is an acknowledgment frame for the radio frame, or an acknowledgment message for the radio frame.

After sending the acknowledgment frame (namely, the acknowledgment message) for the radio frame to the second device, the first device switches to the first configuration.

604: The second device sends the data to the first device by using a second parameter.

Optionally, after receiving the acknowledgment frame (namely, the acknowledgment message) from the first device, the second device sends the data to the first device by using the second parameter. Based on this solution, the second device confirms that the first device has successfully received the radio frame. This avoids a data transmission failure and improves data transmission performance.

In at least one embodiment, the second parameter indicates a parameter supported by the first configuration.

An occasion on which the first device switches to the first configuration is not limited In at least one embodiment. For example, the first device switches to the first configuration after receiving the radio frame sent by the second device by using the first parameter; or the second device sends the data to the first device by using the second parameter after sending the radio frame to the first device by using the first parameter.

605: In response to a preset condition being met, the first device restores the second configuration for communication.

In the second communication mode, the first device switches from the second configuration to the first configuration, or switches from the first configuration back to the second configuration.

In at least one embodiment, after entering the second communication mode, the multi-link device (for example, the first device) dynamically switches between different configurations (for example, the first configuration and the second configuration). A balance is achieved between a high rate and low power consumption.

In at least one embodiment, the preset condition indicates whether sending of the data by the second device to the first device ends.

For example, in response to sending of the data ending or data transmission ending indicates that all data transmitted by the second device to the first device is transmitted, or that the second device completes data transmission to the first device.

For example, after sending of the data by the second device to the first device ends, the first device restores the second configuration for use. This reduces power consumption.

In at least one embodiment, the preset condition indicates whether sending of data by the second device on some links included under the first configuration ends.

For example, sending of the data by the second device on the some links included under the first configuration ends, the first device restores the second configuration for use. In other words, after sending of most data ends, the first device restores the second configuration for use.

For another example, after sending of the data by the second device on the some links included under the first configuration ends, the first device disables the links. This saves more energy. There are a plurality of manners of determining links on which data has been sent. This is not limited In at least one embodiment. For example, a link on which data has been sent is determined based on a third field on each link. For another example, a link on which data has been sent is determined in a bitmap manner.

For the preset condition, the foregoing two cases are merely examples for description. This is not limited In at least one embodiment. For example, the second device notifies the first device to restore the second configuration for communication.

Optionally, the first device determines, by using the following method, whether sending of the data by the second device ends, or whether the data transmission of the second device ends.

Method 1: The second device sends a data frame on all links included under the first configuration, and determines, based on a third field of the data frame, whether sending of the data by the second device ends. The third field indicates whether sending of the data ends.

Optionally, the third field is, for example, a more data field. To be specific, whether sending of the data ends is determined based on the more data field in the data frame. The following uses the more data field as an example for description.

For example, whether sending of the data ends is determined based on a value of the more data field.

For example, the second device sends the data frame on all the links included under the first configuration. In response to the value of the more data field in the data frame sent by the second device on each link being 0, the first device considers that sending of the data by the second device ends, so that the first device restores the second configuration for use.

For another example, the second device sends the data frame on all the links included under the first configuration. In response to the value of the more data field in the data frame sent by the second device on some links being 0, the first device considers that sending of the data by the second device ends, so that the first device restores the second configuration for use.

For another example, the second device sends the data frame on all the links included under the first configuration. In response to the value of the more data field in the data frame sent by the second device on some links being 0, the first device considers that sending of the data by the second device on the links ends, so that the first device disables the links.

The more data field is an example for description, and embodiments described herein are not limited thereto. For example, a field is redefined in the data frame as the third field.

Method 2: Whether sending of the data by the second device ends is determined based on control information carried by the second device in the data frame.

For example, the control information is carried in a fourth field. In this case, based on a value of the fourth field, a determination is made whether sending of the data by the second device ends.

The fourth field is, for example, a multi-link more data field, and a name of the fourth field does not limit the protection of embodiments described herein.

Optionally, the first device determines, based on the value of the fourth field, whether sending of the data by the second device ends. A value of the fourth field is a third value or a fourth value, and the third value and the fourth value are different. For example, in response to the value of the fourth field being the third value, sending of the data by the second device ends, so that the first device restores the second configuration for use; or in response to the value of the fourth field being the fourth value, sending of the data by the second device does not end, so that the first device continues to use the first configuration. For example, the third value is 0, and the fourth value is 1; or the third value is 1, and the fourth value is 0.

For example, the fourth field is a newly defined field, or is an existing field. This is not limited herein.

For example, the fourth field is carried at a physical layer, for example, carried in a signaling field of a physical layer preamble; or is carried in media access control (MAC), for example, carried in a MAC header. For example, the fourth field is carried in the MAC. For example, the fourth field is carried in an OMI field or a command and status (CAS) field. For another example, a new control information type is defined to carry the fourth field. For example, the new control information type is defined in a high efficiency (HE) variant of a high throughput (HT) control field (HE variant of HT Control field) to carry the fourth field.

Similar to the method 1, in the method 2, after determining that sending of data on all links ends, the first device restores the second configuration for use. Alternatively, after determining that sending of data on some links ends, the first device restores the second configuration for use. Alternatively, after determining that sending of data on some links ends, the first device disables the some links.

The foregoing two methods are examples for description. This is not limited In at least one embodiment. Any method that enables the first device to determine whether sending of the data by the second device ends is used in at least one embodiment.

A solution in which the first device determines whether sending of the data by the second device ends is used independently, or is used in combination with the solution in the method 300. In an example, a solution in which the first device determines whether sending of the data by the second device ends is used in combination with the solution in the method 300. For example, after the first device switches to the second communication mode, the second device transmits the data to the first device by using the first configuration. After determining, by using the foregoing method, that sending of the data ends, the first device continues to be in the second communication mode, and restore the second configuration for communication. In still another example, a solution in which the first device determines whether sending of the data by the second device ends is independently used. For example, after determining, by using the foregoing method, that sending of the data ends, the first device enters a sleep mode.

Optionally, the second information in the first message indicates whether the first device switches, after entering the second communication mode, to the first configuration after receiving the radio frame from the second device, and switch to the second configuration again after the preset condition is met, for example, after the data is received. For example, the second information in the first message indicates whether operations of step 603 to step 605 is performed.

For example, the second information is carried in a second field, and is determined based on a value of the second field. For example, in response to the value of the second field being 1, the operations of step 603 to step 605 are performed; or in response to the value of the second field being 0, the operations of step 603 to step 605 are not performed. Alternatively, in other words, in the second communication mode, the first device always uses the second configuration for communication.

The foregoing describes in detail content of switching from the first communication mode to the second communication mode by the first device. The following describes a case in which the first device switches from the second communication mode to the first communication mode.

Scenario 2: communication modes of the first device and the second device are switched from the second communication mode to the first communication mode.

The following provides an example for description with reference to FIG. 7.

FIG. 7 is a schematic interaction diagram of a communication mode switching method 700 applicable to at least one embodiment. The method 700 includes the following steps.

710: The first device communicates with the second device by using a second configuration.

In other words, in the second communication mode, the first device communicates with the second device by using the second configuration.

720: The first device sends a first message to the second device, where the first message is used to notify that the communication mode is switched to the first communication mode.

For the first message, refer to the description in the foregoing method 300. Details are not described herein again.

The frame structure shown in FIG. 5 is used as an example. A value of a first field is 1 indicates that the first device switches the communication mode; and that the value of the first field is 0 indicates that the first device does not switch the communication mode, that is, still uses a current communication mode.

In the scenario 2, the value of the first field is 1. After receiving the first message, the second device determines, based on that the first field is 1, that the first device switches the communication mode to the first communication mode.

730: The first device communicates with the second device by using the first configuration.

In other words, after entering the first communication mode, the first device communicates with the second device by using the first configuration.

In at least one embodiment, after sending the first message to the second device, the first device enters the first communication mode; and after receiving the first message from the first device, the second device enters the first communication mode.

In at least one embodiment, after receiving a second message, the first device enters the first communication mode; and after sending the second message to the first device, the second device enters the first communication mode. For example, after receiving the first message from the first device, the second device sends an acknowledgment message for the first message to the first device, that is, confirm that the first device enters the first communication mode. For another example, after the receiving the first message from the first device, the second device sends a response message for the first message to the first device, that is, the first device enters the first communication mode.

The foregoing describes two switching scenarios. The following describes configurations used by the first device for communication in the second communication mode.

In the second communication mode, the first device performs communication by using the second configuration.

Case 1: The first device communicates with the second device by using the first configuration.

In the case 1, in the second communication mode, the first device switches from the second configuration to the first configuration.

In at least one embodiment, the second device sends a radio frame to the first device by using a first parameter. After receiving the radio frame, the first device sends a third message (or sends an acknowledgment frame) to the second device. After sending the third message, the first device switches to the first configuration, that is, communicates with the second device by using the first configuration. After receiving the third message, the second device sends data to the first device by using a second parameter.

In at least one embodiment, the second device sends the radio frame to the first device by using the first parameter. After receiving the radio frame, the first device directly switches to the first configuration. After receiving the radio frame sent by the second device, the first device switches to the first configuration, that is, communicates with the second device by using the first configuration. After sending the radio frame, the second device sends the data to the first device by using the second parameter.

Optionally, in response to a preset condition being met, the first device restores the second configuration for communication.

For the case 1, refer to the description in the foregoing method 600. Details are not described herein again.

Based on the foregoing case 1, the first device switches from performing communication by using the second configuration to performing communication by using the first configuration. In addition, after entering the second communication mode (or referred to as a multi-link power save mode), multi-link devices (for example, the first device and the second device) dynamically switches between the first configuration and the second configuration. A balance is achieved between a high rate and low power consumption.

Case 2: The first device communicates with the second device by using a third configuration recommended by the second device.

In the case 2, in the second communication mode, the first device and the second device switches from the second configuration to the third configuration.

The second device sends information about the third configuration to the first device. Alternatively, the second device recommends, to the first device, the third configuration for communication. In other words, the second device sends a configuration recommendation frame to the first device.

In at least one embodiment, the second device sends the information about the third configuration to the first device by using the first parameter. After receiving the information about the third configuration, the first device sends a third message to the second device (or in other words, sends an acknowledgment frame or sends a configuration acknowledgment frame). After sending the third message, the first device switches to the third configuration, that is, communicates with the second device by using the third configuration. After receiving the third message, the second device sends data to the first device by using a third parameter. The third parameter is a parameter supported by the third configuration.

In at least one embodiment, the second device sends the information about the third configuration to the first device by using the first parameter. After receiving the information about the third configuration, the first device directly switches to the third configuration. After receiving the information that is about the third configuration and that is sent by the second device, the first device switches to the third configuration, that is, communicates with the second device by using the third configuration. After sending the information about the third configuration, the second device sends the data to the first device by using the third parameter.

Optionally, in response to the preset condition being met, the first device restores the second configuration for use.

For this, refer to the description in step 605 in the method 600. Details are not described herein again.

Optionally, the information about the third configuration includes, for example, a group of configuration parameters, namely, configuration parameters used in response to the second device subsequently sending a data frame to the first device. For example, the configuration parameter includes one or more link IDs. In addition, the configuration parameters further incudes operating bandwidth of each link, an NSS of each link, whether to support uplink multi-user transmission, whether to support an extended-range transmission mode, and the like.

The one or more link IDs indicate one or more links used in response to the second device subsequently sending the data frame to the first device. Correct communication is implemented by learning the link ID.

A number of spatial streams of each link indicates a number of spatial streams used in response to the second device subsequently sending the data frame to the first device. The number of spatial streams includes, for example, a number of transmit (Tx) spatial streams (Tx NSS), or includes a number of receive (Rx) spatial streams (Rx NSS).

The bandwidth of each link indicates bandwidth used in response to the second device subsequently sending the data frame to the first device, for example, maximum bandwidth used in response to the second device subsequently sending the data frame to the first device.

The following describes a frame structure that carries the information about the third configuration.

Figure 8:
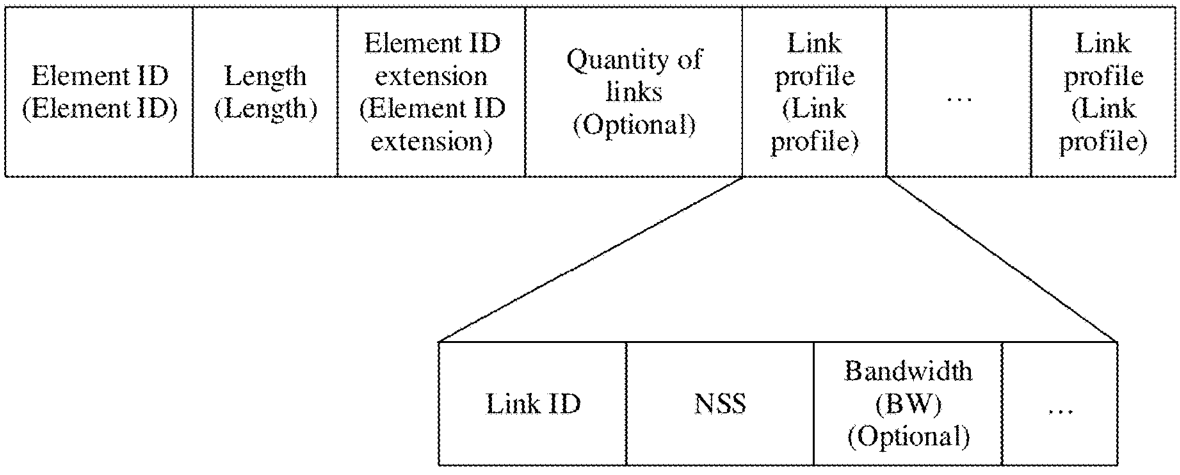
FIG. 8 and FIG. 9 are schematic diagrams of frame structures of a communication mode switching method according to at least one embodiment.

In at least one embodiment, the information about the third configuration is carried by using a frame structure shown in FIG. 8.

As shown in FIG. 8, the frame structure includes, for example, an element ID field, a length (namely, a frame length) field, an element ID extension field, and a link profile of each link (or information about each link). Optionally, the frame structure further includes a quantity of links (number of links).

For example, the link profile includes a link ID and a number of spatial streams (namely, a number of spatial streams of a link, or both of a Tx NSS and an Rx NSS that is indicated by using one parameter). Alternatively, bandwidth (namely, bandwidth of the link, for example, maximum bandwidth of the link) is further included.

Figure 9:
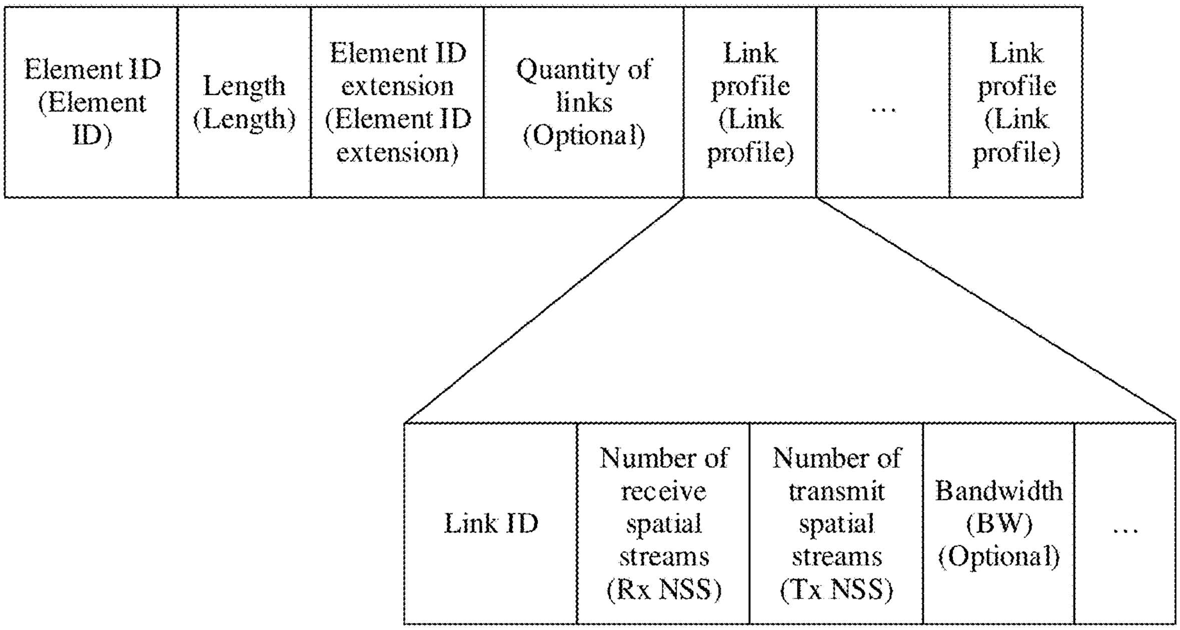

In at least one embodiment, the information about the third configuration is carried by using a frame structure shown in FIG. 9.

Different from FIG. 8, in the frame structure shown in FIG. 9, a number of spatial streams of each link includes a Tx NSS and an Rx NSS.

The frame structures shown in FIG. 8 and FIG. 9 are merely examples for description. This is not limited In at least one embodiment. For example, the frame structure includes more fields or fewer fields.

Based on the foregoing case 2, the first device switches from performing communication by using the second configuration to performing communication by using the third configuration. In addition, the second device recommends, to the first device based on an actual communication requirement, a configuration parameter, namely, the third configuration, for transmitting a data frame. Data transmission performance is improved.

Case 3: The first device uses, for communication, a fourth configuration obtained after the third configuration is adjusted.

IN the case 3, in the second communication mode, the first device switches from the second configuration to the fourth configuration.

Figure 10:
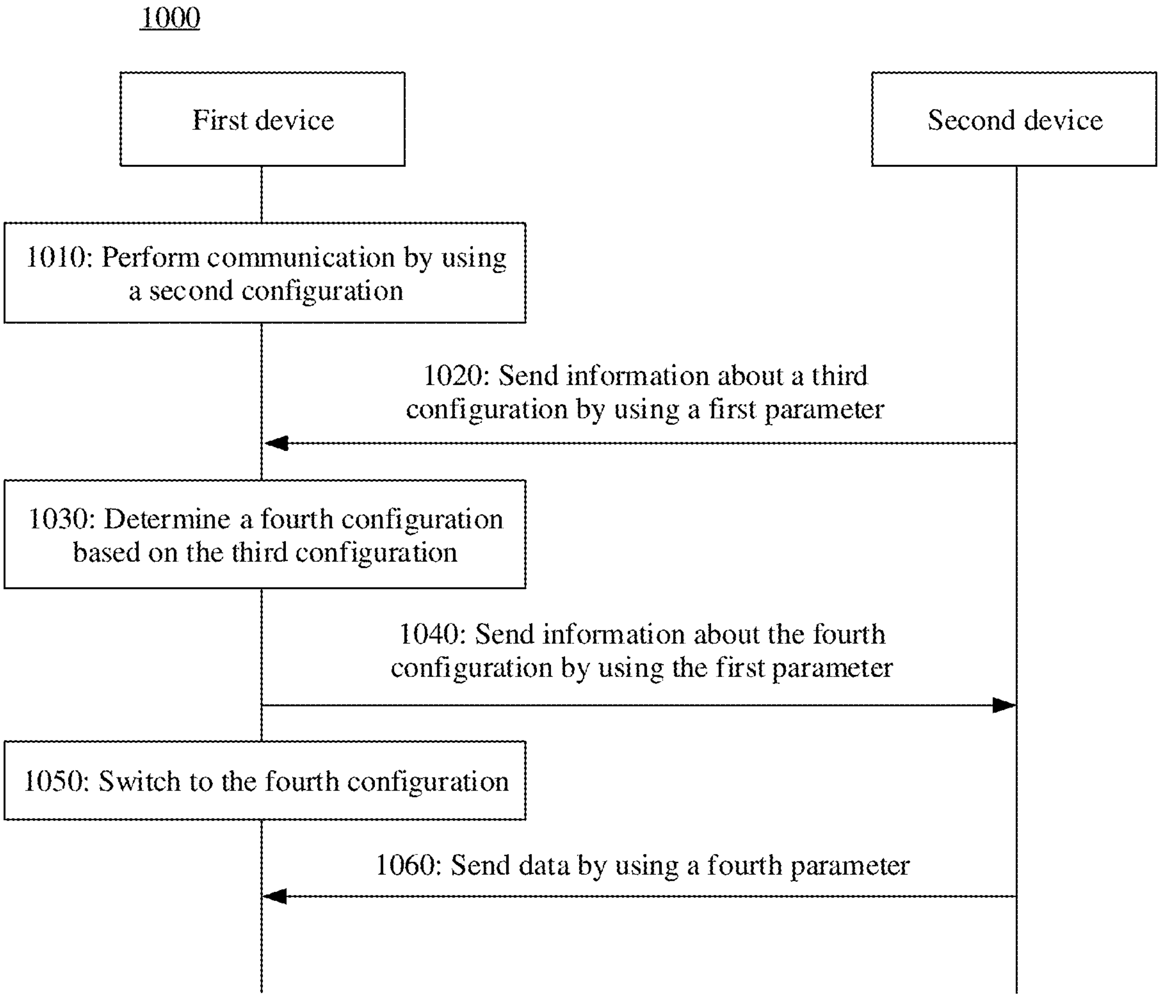
FIG. 10 is a schematic interaction diagram of a communication mode switching method according to at least one embodiment.

The following provides description by using an example with reference to a method 1000 shown in FIG. 10.

1010: The first device performs communication by using the second configuration.

1020: A second device sends information about the third configuration to the first device by using a first parameter.

In other words, the second device sends a configuration recommendation frame to the first device. The first parameter indicates a parameter supported by the second configuration.

For the third configuration, refer to the description in the case 2. Details are not described herein again.

1030: The first device determines the fourth configuration based on the third configuration.

A manner in which the first device determines the fourth configuration based on the third configuration is not limited In at least one embodiment. For example, the first device adjusts a parameter of the third configuration (for example, the first device adjusts a quantity of links of the third configuration) based on an actual communication status or a network environment, to obtain the fourth configuration.

After the second device recommends the third configuration to the first device, the first device adjusts the parameter configuration. In this way, excessive links, spatial streams, and bandwidth are not used. This reduces an energy waste.

1040: The first device sends information about the fourth configuration to the second device by using the first parameter, where the information about the fourth configuration includes a configuration parameter to be used by the first device in subsequent data transmission.

In other words, the first device sends a configuration acknowledgment frame to the second device by using the first parameter, and the fourth configuration is a configuration indicated in the configuration acknowledgment frame.

Optionally, after receiving the information about the third configuration and before switching to the fourth configuration, the first device sends a third message to the second device, where the third message includes the information about the fourth configuration, and the third message is used to notify the first device of the configuration parameter to be used in the subsequent data transmission.

Optionally, the information about the fourth configuration includes, for example, a group of configuration parameters, namely, configuration parameters used in response to the second device subsequently sending a data frame to the first device. The configuration parameter includes one or more link IDs. In addition, the configuration parameters further include operating bandwidth of each link, an NSS of each link, whether to support uplink multi-user transmission, whether to support an extended-range transmission mode, and the like.

For the foregoing parameters, refer to the description in the case 2.

Optionally, the information about the fourth configuration is carried by using the frame structure shown in FIG. 8 or FIG. 9.

1050: The first device switches to the fourth configuration.

Optionally, after sending the information about the fourth configuration to the second device, the first device switches to the fourth configuration.

1060: The second device sends the data to the first device by using a fourth parameter.

In at least one embodiment, the fourth parameter indicates a parameter supported by the fourth configuration.

Optionally, in response to the preset condition being met, the first device restores the second configuration for use.

For this, refer to the description in step 605 in the method 600. Details are not described herein again.

Based on the foregoing case 3, the first device switches from performing communication by using the second configuration to performing communication by using the fourth configuration. In addition, the first device adjusts the parameter configuration of the first device based on a configuration of the data frame subsequently sent by the second device, to avoid using excessive links, spatial steams, and bandwidth. This reduces an energy waste. In addition, an objective of using a most appropriate configuration for communication is achieved by using the configuration recommendation frame (for example, the third configuration) and the configuration acknowledgment frame (for example, the fourth configuration).

The foregoing describes, by using the three cases, the configuration used by the first device for communication in the second communication mode. After entering the second communication mode (or the multi-link power save mode), the multi-link device (for example, the first device) dynamically switches between the plurality of configurations (for example, between the second configuration and the first configuration, between the second configuration and the third configuration, or between the second configuration and the fourth configuration) by using the foregoing solution. This achieves a balance between a high rate and low power consumption, and achieves the objective of using a most appropriate configuration for communication.

Figure 11:
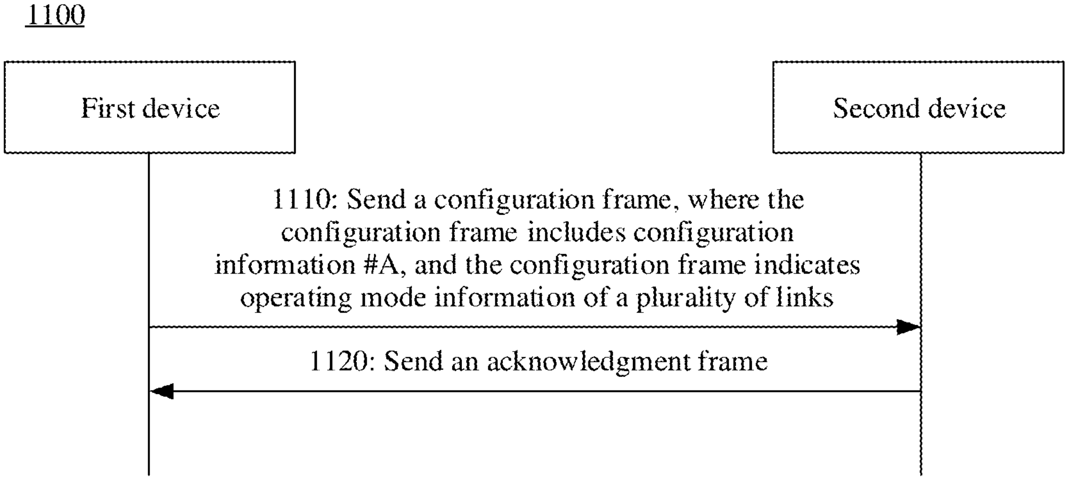
FIG. 11 is a schematic interaction diagram of a communication mode switching method according to at least one embodiment.

Information that indicates a link, for example, indicates the configuration information (for example, the first configuration, the second configuration, the third configuration, or the fourth configuration) and that is mentioned above in a plurality of parts includes information about one or more links. With reference to FIG. 11, the following describes in detail a solution in which operating parameters of a plurality of links are indicated by using one piece of signaling. The solution shown in FIG. 11 is used independently, or is used in combination with the solution of the method 300, the method 600, or the method 700.

FIG. 11 is a schematic diagram of another communication mode switching method 1100 according to at least one embodiment.

1110: A first device sends a configuration frame to a second device, where the configuration frame carries configuration information #A, and the configuration frame indicates operating mode information of a plurality of links.

1120: The second device sends an acknowledgment frame to the first device.

After sending the acknowledgment frame, the second device performs transmission with the first device by using a transmission parameter supported by the configuration information #A.

In at least one embodiment, the operating mode information of the plurality of links is indicated at a time by using one piece of signaling, and the plurality of links do not need to be separately enabled. The operating mode information of each link is indicated one by one by using each link. This further reduces energy consumption.

At least one embodiment is described by using an example in which the configuration frame indicates the operating mode information of the plurality of links. This is not limited in at least one embodiment. The solution in at least one embodiment is also applicable to a case in which the configuration frame indicates operating mode information of one link.

In at least one embodiment, one RF chain is used to add a new communication link, or is used to increase a number of spatial streams of a link. Specifically, a quantity of newly added links is determined based on various factors, or the number of spatial streams of the link is increased. The factors includes but are not limited to a relationship between bandwidth of a newly added link and bandwidth of an existing link, whether multi-link devices (for example, the first device and the second device) performs simultaneous receiving and sending between the newly added link and the existing link, and a channel busy/idle state of the newly added link, for example, a percentage of busy channels, channel state information of the newly added link and the existing link, and the like. In response to the factors changing, the multi-link devices (for example, the first device and the second device) need to flexibly change RF chain configurations of the multi-link devices, to implement efficient resource utilization. Therefore, In at least one embodiment, configurations of a link and a number of spatial streams is changed. For example, in response to the configuration frame being sent, a relatively optimal configuration or an optimal configuration is selected, to flexibly configure an RF chain resource, and properly use the RF chain. Details are described below.

For example, the configuration information #A is the information about the first configuration described above. In other words, in response to indicating the information about the first configuration to the second device, the first device indicates the information about the first configuration by using the solution described in the method 1100. For another example, the configuration information #A is, for example, the information about the second configuration described above. In other words, in response to indicating the information about the second configuration to the second device, the first device indicates the information about the second configuration by using the solution described in the method 1100. For another example, the configuration information #A is, for example, the information about the third configuration described above. In other words, in response to indicating the information about the third configuration to the first device, the second device indicates the information about the third configuration by using the solution described in the method 1100. For another example, the configuration information #A is, for example, the information about the fourth configuration described above. In other words, in response to indicating the information about the fourth configuration to the second device, the first device indicates the information about the fourth configuration by using the solution described in the method 1100. FIG. 11 is described by using an example in which the first device sends the indication information to the second device. In response to the second device indicating the information about the third configuration to the first device, this solution is also used.

The configuration information #A is a general name, and does not limit the protection of embodiments described herein.

The configuration frame is a frame indicating the configuration information #A. The configuration frame is a name for differentiation, and does not limit the protection of embodiments described herein. The configuration frame indicates the operating mode information of the plurality of links. At least one embodiment is also applicable to a case in which the operating mode information of the one link of one link is indicated. The operating mode information includes, for example, a number of spatial streams of a link and bandwidth of the link. Optionally, the configuration frame further includes other operating mode information, for example, whether to support uplink multi-user transmission, whether to support an extended-range transmission mode, and the like.

For example, as shown in the frame structure in FIG. 9, the number of spatial streams of the link includes a Tx NSS and an Rx NSS. Alternatively, for example, as shown in the frame structure in FIG. 8, one parameter indicates both of the Tx NSS and the Rx NSS.

Optionally, the configuration frame is sent by a station of the first device.

Optionally, the configuration frame is transmitted by using an existing frame; or the configuration frame is transmitted by using a newly defined frame (for example, a management frame), for example, the EHT action frame shown in FIG. 4.

For example, the frame body includes one or more pieces of information. For example, the frame body includes information shown in the following Table 2.

TABLE 2

| Order | Information |
|---|---|
| 1 | Category |
| 2 | EHT action |
| 3 | Configuration information #A |

Table 2 is an example, and embodiments described herein are not limited thereto. For example, the frame body further includes more content.

Names of the foregoing pieces of information are merely used to distinguish between different functions, and do not limit the protection of embodiments described herein. Names indicating a same function in a future protocol all fall within the protection of embodiments described herein. For example, a field used to carry the configuration information #A is an ML SM configuration information element field.

For example, a structure of a configuration information #A unit is shown in FIG. 8 or FIG. 9. For details, refer to the foregoing description. Details are not described herein again. Alternatively, the structure of the configuration information #A unit is shown in FIG. 12.

Figure 12:
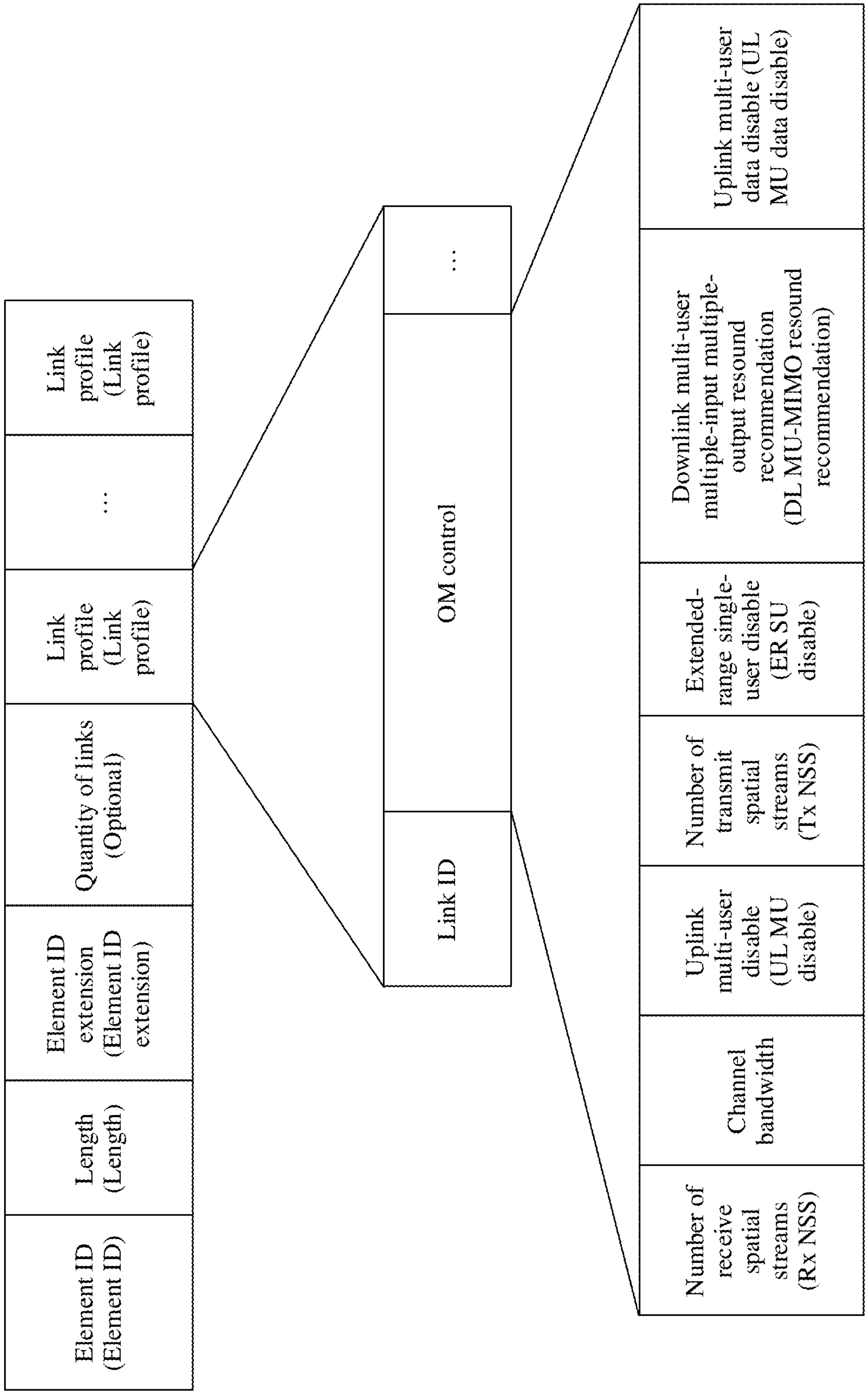
FIG. 12 is a schematic diagram of a frame structure of a communication mode switching method according to at least one embodiment.

Different from FIG. 8 or FIG. 9, the structure shown in FIG. 12 includes an operating mode (OM) control (OM control) field. For example, the OM control field includes but is not limited to an Rx NSS, a channel bandwidth field, an uplink (UL) multi-user (MU) disable (UL MU disable) field, a Tx NSS, an extended-range (ER) single-user (single-user) disable (ER SU disable) field, a downlink (DL) multi-user multiple-input multiple-output (MU-MIMO) resound recommendation (DL MU-MIMO resound recommendation) field, and an uplink multi-user data disable (UL MU data disable) field.

The frame structure shown in FIG. 12 is an example for description. This is not limited in at least one embodiment. For example, the frame structure includes more fields or fewer fields.

In addition, optionally, the configuration information #A is carried at a physical layer, for example, carried in a signaling field of a physical layer preamble; or is carried in MAC, for example, carried in a MAC header. For example, the configuration information #A is carried in the MAC. For example, a new control information type is defined in an HE variant of an HT control field to carry the configuration information #A. The newly defined control information carries a maximum of 26 bits, that is, the 26 bits carries the configuration information #A. A frame structure of the newly defined control information is designed as any one of the following.

Design 1: The frame structure includes a spatial stream (SS) allocation field and a link ID field.

The SS allocation field carries allocation information of a spatial stream. In other words, the SS allocation field carries allocation information of all spatial streams allocated to all links.

The link ID field carries identification information of the link, that is, indicate the links to which the spatial streams are allocated.

FIG. 13 shows a frame structure. As shown in FIG. 13, the frame structure includes the SS allocation field and the link ID field.

The link ID field includes, for example, a link ID 1, a link ID 2, a link ID 3, and a link ID 4. FIG. 13 is an example for description. Based on different communication cases, the link ID field includes more or fewer link IDs.

There are a maximum of 16 spatial streams, and the spatial streams are allocated to a maximum of four links. After calculation, there are at least 576 allocation schemes. Therefore, 10 bits are used to distinguish each allocation scheme. As shown in FIG. 13, the link ID 1, the link ID 2, the link ID 3, and the link ID 4 are identification information of links, that is, indicate the links to which the spatial streams are allocated. In response to a number of allocated links being less than 4, a special link identifier, for example, a dummy link identifier (dummy link ID), also indicates that link indication is complete. For example, in response to the special link identifier being all is (that is, a value of each bit is 1), the link indication is complete.

Design 2: The frame structure includes an SS allocation field and a link bitmap field.

The SS allocation field carries allocation information of a spatial stream. In other words, the SS allocation field carries allocation information of all spatial streams allocated to all links.

The link bitmap field indicates the links to which the spatial streams are allocated.

FIG. 14 shows a frame structure. As shown in FIG. 14, the frame structure includes the SS allocation field and the link bitmap field. The frame structure shown in FIG. 14 is used as an example, and 16 bits indicates allocation of spatial streams. Specifically, each of the 16 bits indicates a link to which a corresponding spatial stream is allocated. For example, in response to a value of a corresponding bit being the same as a value of a previous bit, the spatial stream is allocated to a same link; in response to the value of the corresponding bit being different from the value of the previous bit, the spatial stream is allocated to a next link.

For example, as shown in FIG. 15, a value of the SS allocation field is 0000110101000001111. In response to starting from link 1, a link indicated by each of first four bits is allocated to the link 1 (that is, a value of each of the first four bits is 0), a link indicated by each of the following four bits is allocated to a link 2 (that is, a value of each of the following four bits is 1), a link indicated by each of the following four bits is allocated to a link 3 (that is, a value of each of the following four bits is 0), and a link indicated by each of last four bits is allocated to a link 4 (that is, a value of each of the following four bits is 0).

The link bitmap field indicates the link to which the spatial stream is allocated. A total quantity of links is 8, and the SS allocation field allocates all spatial streams to four links (as shown in FIG. 15). In this case, a length of the link bitmap field is 8 bits, and values of four bits are 1, which correspond to four links to which the spatial streams are allocated. In response to values of only three bits being 1, only a number of spatial streams indicated by first three consecutive segments of 0s or 1s in the SS allocation field are allocated to a link.

Design 3: The frame structure includes a link ID field and an NSS field.

The link ID field and the NSS field respectively indicate an identifier of a link and a number of allocated spatial streams.

FIG. 16 shows a frame structure. As shown in FIG. 16, the frame structure includes a plurality of link ID fields and the NSS field. In response to each of the link ID field and the NSS field being 4 bits, three links is indicated in total. In response to each of the link ID field and the NSS field being 3 bits, four links are indicated in total.

FIG. 13 to FIG. 16 are examples for description, and the frame structures shown in FIG. 13 to FIG. 16 are not limited in embodiments described herein.

In at least one embodiment, quantities of spatial streams of a plurality of links are indicated at a time by using one piece of signaling, and the plurality of links do not need to be separately enabled. A number of spatial streams of each link is indicated one by one by using each link. This further reduces energy consumption. In addition, in response to the configuration frame being sent, the relatively optimal configuration or the optimal configuration is selected. Therefore, not only the RF chain resource is flexibly configured, and the RF chain is properly used, but also more power is saved.

Message names and field names in the foregoing embodiments are merely used to distinguish between different functions, and do not limit the protection of embodiments described herein. Names indicating a same function in a future protocol all fall within the protection of embodiments described herein.

The frame structures in some of the foregoing embodiments, as shown in FIG. 4, FIG. 5, FIG. 8, FIG. 9, and FIG. 12 to FIG. 16, are all examples for description, and any variation that belongs to the frame structures falls within the protection of embodiments described herein.

Based on the foregoing technical solution, the multi-link device (for example, the first device) dynamically switches between two communication modes. For example, in some cases, for example, in response to a communication requirement being low, the first device sends a first message to the second device, where the first message requests to switch to a second communication mode. For another example, in some cases, for example, in response to the communication requirement being high, the first device sends the first message to the second device, where the first message requests to switch to a first communication mode. Therefore, in response to the communication service requirement being low, an unnecessary link is disabled, and a number of spatial streams of the link is reduced, to achieve a power save objective.

In addition, based on the foregoing technical solution, after entering the second communication mode (or a multi-link power save mode), the multi-link device (for example, the first device) dynamically switches between a plurality of configurations (for example, between the second configuration and the first configuration, between the second configuration and the third configuration, or between the second configuration and the fourth configuration). This achieves a balance between a high rate and low power consumption, and achieves an objective of using a most appropriate configuration for communication.

Embodiments described herein are independent solutions, or are combined based on internal logic. All these solutions fall within the protection scope of embodiments described herein. For example, in the method 600, a solution in which the first device restores the second configuration from the first configuration is used in a solution in which the first device restores the second configuration from the third configuration, or is used in a solution in which the first device restores the second configuration from the fourth configuration. For another example, a solution of the configuration information #A is used by the first device to indicate the first configuration, the second configuration, or the third configuration to the second device, or used by the second device to indicate the fourth configuration to the first device. For another example, the solution shown in the method 1100 is used independently, or is used in combination with the method 300, the method 600, or the method 700. For another example, a solution in which the first device determines whether sending of data by the second device ends is used independently, or is used in combination with the solution in the method 300, the method 600, the method 700, or the method 1100.

The methods and operations implemented by the first device is alternatively implemented by a component (for example, a chip or a circuit) applicable to the first device, and the methods and operations implemented by the second device in the foregoing method embodiments is alternatively implemented by a component (for example, a chip or a circuit) applicable to the second device.

The methods according to at least one embodiment are described above in detail with reference to FIG. 3 and FIG. 16. The apparatuses provided in at least one embodiment are described below in detail with reference to FIG. 17 to FIG. 20. Description of apparatus embodiments corresponds to the description of the method embodiments. Therefore, for content that is not described in detail, refer to the foregoing method embodiments. For brevity, details are not described herein again.

The foregoing describes the solutions provided in at least one embodiment from the perspective of interaction between devices. To implement the foregoing functions, the devices, for example, the first device and the second device, include corresponding hardware structures and/or software modules for performing the functions. A person skilled in the art is aware that, with reference to the examples described in embodiments disclosed in this specification, units and algorithm steps is implemented by hardware or a combination of hardware and computer software. Whether a function is performed by hardware or hardware driven by computer software depends on particular applications and design constraints of the technical solutions. A person skilled in the art uses different methods to implement the described functions for each particular application, but the implementation does not go beyond the protection scope of embodiments described herein.

In at least one embodiment, the first device and the second device are divided into functional modules based on the foregoing method examples. For example, the functional modules are obtained through division based on corresponding functions, or two or more functions are integrated into one processing module. The integrated module is implemented in a form of hardware, or is implemented in a form of a software function module. In at least one embodiment, division into the modules is an example, and involves a logical function division. In an actual implementation, another feasible division manner is available. An example in which each functional module is obtained through division based on a corresponding function is used below for description.

FIG. 17 is a schematic block diagram of a communication apparatus according to at least one embodiment. The communication apparatus 1700 includes a transceiver unit 1710 and a processing unit 1720. The transceiver unit 1710 implements a corresponding communication function, and the processing unit 1710 is configured to perform data processing. The transceiver unit 1710 is also referred to as a communication interface or a communication unit.

Optionally, the communication apparatus 1700 further includes a storage unit. The storage unit is configured to store instructions and/or data. The processing unit 1720 reads the instructions and/or data in the storage unit, to enable the communication apparatus to implement the foregoing method embodiments.

The communication apparatus 1700 is configured to perform the actions performed by the first device in the foregoing method embodiments. In this case, the communication apparatus 1700 is the first device or a component that is configured in the first device. The transceiver unit 1710 is configured to perform receiving/sending-related operations on the first device side in the foregoing method embodiments. The processing unit 1720 is configured to perform processing-related operations on the first device side in the foregoing method embodiments.

Alternatively, the communication apparatus 1700 is configured to perform the actions performed by the second device in the foregoing method embodiments. In this case, the communication apparatus 1700 is the second device or a component that is configured in the second device. The transceiver unit 1710 is configured to perform receiving/sending-related operations on the second device side in the foregoing method embodiments. The processing unit 1720 is configured to perform processing-related operations on the second device side in the foregoing method embodiments.

In a design, the communication apparatus 1700 is configured to perform the actions performed by the first device in the foregoing method embodiments. The transceiver unit 1710 is configured to send a first message to a second device, where the first message is used to notify the second device that the communication apparatus 1700 switches a communication mode. The switching a communication mode includes switching from a first communication mode to a second communication mode, or the switching a communication mode includes switching from the second communication mode to the first communication mode. The processing unit 1720 is configured to configure the communication apparatus 1700 to switch from the first communication mode to the second communication mode, or switch from the second communication mode to the first communication mode. The first communication mode includes a first configuration, and the second communication mode includes the first configuration and a second configuration. Under the first configuration, the first device performs communication on N links, under the second configuration, the first device performs communication on M links, M is an integer greater than 1 or equal to 1, N is an integer greater than 2 or equal to 2, and N is greater than M.

In at least one embodiment, the transceiver unit 1710 is further configured to receive a second message from the second device, where the second message is a response message or an acknowledgment message for the first message; and the processing unit 1720 is further configured to switch the communication mode.

In at least one embodiment, in response to the communication apparatus 1700 being in the second communication mode, the transceiver unit 1710 is further configured to perform communication by using the second configuration; or the transceiver unit 1710 is further configured to switch between the first configuration and the second configuration for communication.

In at least one embodiment, in response to the communication apparatus 1700 being in the second communication mode, the transceiver unit 1710 is further configured to perform communication by using the second configuration; the transceiver unit 1710 is further configured to receive a radio frame from the second device; the processing unit 1720 is further configured to switch to the first configuration; and the transceiver unit 1710 is further configured to transmit data to the second device by using the first configuration.

In at least one embodiment, in response to the communication apparatus 1700 being in the second communication mode, the transceiver unit 1710 is further configured to perform communication by using the second configuration; the transceiver unit 1710 is further configured to receive information about a third configuration from the second device; the processing unit 1720 is further configured to switch to the third configuration based on the information about the third configuration; and the transceiver unit 1710 is further configured to transmit data to the second device by using the third configuration.

In at least one embodiment, in response to the communication apparatus 1700 being in the second communication mode, the transceiver unit 1710 is further configured to perform communication by using the second configuration; the transceiver unit 1710 is further configured to receive information about a third configuration from the second device; the processing unit 1720 is further configured to switch to a fourth configuration based on the information about the third configuration, where the fourth configuration is determined based on the third configuration; and the transceiver unit 1710 transmits data to the second device by using the fourth configuration.

In at least one embodiment, the transceiver unit 1710 is further configured to send a third message to the second device, where the third message indicates, to the second device, information about a configuration used for transmitting data.

In at least one embodiment, after the data transmission ends, the transceiver unit 1710 is further configured to perform communication by using the second configuration.

In at least one embodiment, the transceiver unit 1710 is configured to transmit data to the second device by using the first configuration and includes: The transceiver unit 1710 is specifically configured to receive a data frame from the second device on T links. T is an integer greater than 1 or equal to 1; the data frame on each of the T links includes a more data field, the more data field in the data frame on a link indicates whether data transmission on the corresponding link ends, and the processing unit 1720 is further configured to determine, based on the more data field on each link, whether the data transmission ends; or the data frame includes a multi-link more data field, the multi-link more data field indicates whether data transmission on the T links ends, and the processing unit 1720 is further configured to determine, based on the multi-link more data field, whether the data transmission ends.

In at least one embodiment, the transceiver unit 1710 is further configured to send indication information to one station of the second device. The indication information includes information about the first configuration or information about the second configuration, and the indication information indicates configuration information of each station on one or more links of the communication apparatus 1700.

In at least one embodiment, the first message includes one or more of the following: first information, information about a communication link, and second information; the first information indicates whether the communication apparatus 1700 switches from the first communication mode to the second communication mode; the information about the communication link indicates a communication link obtained after the communication mode is switched; and the second information indicates whether the communication apparatus 1700 switches between the first configuration and the second configuration in response to the communication apparatus 1700 being in the second communication mode.

In at least one embodiment, the information about the first configuration or the information about the second configuration includes one or more pieces of the following information: an identifier of a link, a number of spatial streams of the link, bandwidth of the link, whether to support uplink multi-user transmission, and whether to support an extended-range transmission mode.

The communication apparatus 1700 implements steps or procedures performed by the first device in FIG. 3 to FIG. 16 according to at least one embodiment. The communication apparatus 1700 includes units configured to perform the methods performed by the first device in FIG. 3 to FIG. 16. In addition, the units in the communication apparatus 1700 and the foregoing other operations and/or functions are separately used to implement corresponding procedures in FIG. 3 to FIG. 16.

For example, in response to the communication apparatus 1700 being configured to perform the method 300 in FIG. 3, the transceiver unit 1710 is configured to perform step 310 in the method 300, and the processing unit 1720 is configured to perform step 3201 or 3202 in the method 300.

For another example, in response to the communication apparatus 1700 being configured to perform the method 600 in FIG. 6, the transceiver unit 1710 is configured to perform steps 610, 620, 630, 601, 602, and 605 in the method 600, and the processing unit 1720 is configured to perform step 603 in the method 600.

For another example, in response to the communication apparatus 1700 being configured to perform the method 700 in FIG. 7, the transceiver unit 1710 is configured to perform steps 710, 720, and 730 in the method 700.

For another example, in response to the communication apparatus 1700 being configured to perform the method 1000 in FIG. 10, the transceiver unit 1710 is configured to perform steps 1010, 1020, 1040, and 1060 in the method

1000, and the processing unit 1720 is configured to perform steps 1030 and 1050 in the method 1000.

For another example, in response to the communication apparatus 1700 being configured to perform the method 1100 in FIG. 11, the transceiver unit 1710 is configured to perform steps 1110 and 1120 in the method 1100.

A process in which the units perform the foregoing corresponding steps is described in detail in the foregoing method embodiments. For brevity, details are not described herein again.

In at least one embodiment, the communication apparatus 1700 is configured to perform the actions performed by the second device in the embodiment shown in FIG. 3. The transceiver unit 1710 is configured to receive a first message from a first device, where the first message is used to notify the communication apparatus 1700 that the first device switches a communication mode. The switching a communication mode includes: switching from the first communication mode to the second communication mode, or switching from the second communication mode to the first communication mode. The processing unit 1720 is configured to determine a communication mode to which the first device switches. The first communication mode includes a first configuration, and the second communication mode includes the first configuration and a second configuration. Under the first configuration, the communication apparatus 1700 communicates with the first device on N links, under the second configuration, the communication apparatus 1700 communicates with the first device on M links, M is an integer greater than 1 or equal to 1, N is an integer greater than 2 or equal to 2, and N is greater than M.

For example, the transceiver unit 1710 is further configured to communicate with the first device by using a transmission parameter supported by the communication mode to which the first device switches.

In an example, the transceiver unit 1710 is further configured to send a second message to the first device, where the second message is a response message or an acknowledgment message for the first message.

In still another example, the processing unit 1720 is further configured to determine that the communication mode to which the first device switches is the second communication mode; the transceiver unit 1710 is further configured to send a radio frame to the first device by using a first parameter, where the first parameter is a parameter supported by the second configuration; and the transceiver unit 1710 is further configured to: receive a third message from the first device, and transmit data to the first device by using a second parameter, where the second parameter is a parameter supported by the first configuration, and the third message indicates the second device to transmit the data by using the first configuration.

In still another example, the processing unit 1720 is further configured to determine that the communication mode to which the first device switches is the second communication mode; the transceiver unit 1710 is further configured to send information about a third configuration to the first device by using a first parameter; and the transceiver unit 1710 is further configured to: receive a third message from the first device, and transmit data to the first device by using a third parameter, where the third parameter is a parameter supported by the third configuration, and the third message indicates the second device to transmit the data by using the third configuration.

In still another example, the processing unit 1720 is further configured to determine that the communication mode to which the first device switches is the second communication mode; the transceiver unit 1710 is further configured to send information about a third configuration to the first device by using a first parameter; the transceiver unit 1710 is further configured to receive a third message from the first device, where the third message includes information about a fourth configuration; and the transceiver unit 1710 is further configured to transmit data to the first device by using a fourth parameter, where the fourth parameter is a parameter supported by the fourth configuration, and the fourth configuration is determined based on the third configuration.

In still another example, the transceiver unit 1710 is further configured to receive indication information from the first device, where the indication information includes information about the first configuration or information about the second configuration; and the processing unit 1720 is further configured to determine configuration information of each station on one or more links of the first device based on the indication information.

In still another example, the first message includes one or more of the following: first information, information about a communication link, and second information; the first information indicates whether the communication mode of the communication apparatus 1700 is switched from the first communication mode to the second communication mode; the information about the communication link indicates a communication link obtained after the communication mode is switched; and the second information indicates whether the communication apparatus 1700 switches between the first configuration and the second configuration in response to the communication apparatus 1700 being in the second communication mode.

In still another example, the information about the first configuration or the information about the second configuration includes one or more pieces of the following information: an identifier of a link, a number of spatial streams of the link, bandwidth of the link, whether to support uplink multi-user transmission, and whether to support an extended-range transmission mode.

The communication apparatus 1700 implements steps or procedures performed by the second device in FIG. 3 to FIG. 16 according to at least one embodiment. The communication apparatus 1700 includes units configured to perform the methods performed by the second device in FIG. 3 to FIG. 16. In addition, the units in the communication apparatus 1700 and the foregoing other operations and/or functions are separately used to implement corresponding procedures in FIG. 3 to FIG. 16.

For example, in response to the communication apparatus 1700 being configured to perform the method 300 in FIG. 3, the transceiver unit 1710 is configured to perform step 310 in the method 300.

In at least one embodiment, in response to the communication apparatus 1700 being configured to perform the method 600 in FIG. 6, the transceiver unit 1710 is configured to perform steps 610, 620, 630, 601, 602, and 605 in the method 600.

In at least one embodiment, in response to the communication apparatus 1700 being configured to perform the method 700 in FIG. 7, the transceiver unit 1710 is configured to perform steps 710, 720, and 730 in the method 700.

In at least one embodiment, in response to the communication apparatus 1700 being configured to perform the method 1000 in FIG. 10, the transceiver unit 1710 is configured to perform steps 1010, 1020, 1040, and 1060 in the method 1000.

In at least one embodiment, in response to the communication apparatus 1700 being configured to perform the method 1100 in FIG. 11, the transceiver unit 1710 is configured to perform steps 1110 and 1120 in the method 1100.

A process in which the units perform the foregoing corresponding steps is described in detail in the foregoing method embodiments. For brevity, details are not described herein again.

The processing unit 1720 in at least one embodiment is implemented by at least one processor or a processor-related circuit. The transceiver unit 1710 is implemented by a transceiver or a transceiver-related circuit. The transceiver unit 1710 is also referred to as a communication unit or a communication interface. The storage unit is implemented by using at least one memory.

Figure 18:
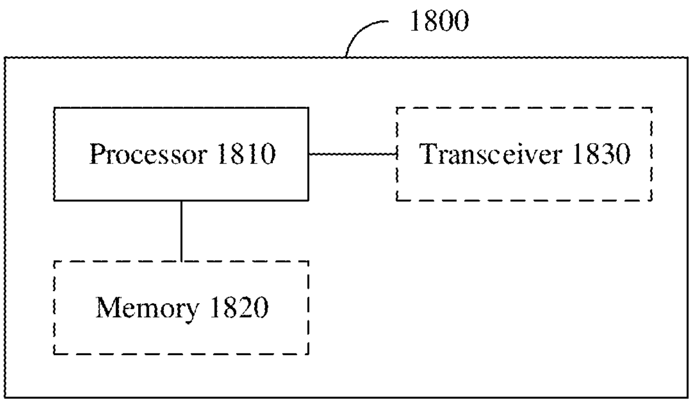
FIG. 18 is a schematic block diagram of still another communication apparatus according to at least one embodiment.

As shown in FIG. 18, at least one embodiment further provides a communication apparatus 1800. The communication apparatus 1800 includes a processor 1810. The processor 1810 is coupled to a memory 1820. The memory 1820 is configured to store a computer program or instructions and/or data. The processor 1810 is configured to execute the computer program or instructions and/or data stored in the memory 1820, so that the methods in the foregoing method embodiments are executed.

Optionally, the communication apparatus 1800 includes one or more processors 1810.

In at least one embodiment, as shown in FIG. 18, the communication apparatus 1800 further includes the memory 1820.

Optionally, the communication apparatus 1800 includes one or more memories 1820.

In at least one embodiment, the memory 1820 is integrated with the processor 1810, or disposed separately from the processor 1810.

In at least one embodiment, as shown in FIG. 18, the communication apparatus 1800 further includes a transceiver 1830, and the transceiver 1830 is configured to receive and/or send a signal. For example, the processor 1810 is configured to control the transceiver 1830 to receive and/or send a signal.

In at least one embodiment, the communication apparatus 1800 is configured to perform the operations performed by the first device in the foregoing method embodiments.

For example, the processor 1810 is configured to perform a processing-related operation performed by the first device in the foregoing method embodiments, and the transceiver 1830 is configured to perform a receiving/sending-related operation performed by the first device in the foregoing method embodiments.

In at least one embodiment, the communication apparatus 1800 is configured to perform the operations performed by the second device in the foregoing method embodiments.

In at least one embodiment, the processor 1810 is configured to perform a processing-related operation performed by the second device in the foregoing method embodiments, and the transceiver 1830 is configured to perform a receiving/sending-related operation performed by the second device in the foregoing method embodiments.

At least one embodiment further provides a communication apparatus 1900. The communication apparatus 1900 is a first device or a chip. The communication apparatus 1900 is configured to perform an operation performed by the first device in the foregoing method embodiments.

Figure 19:
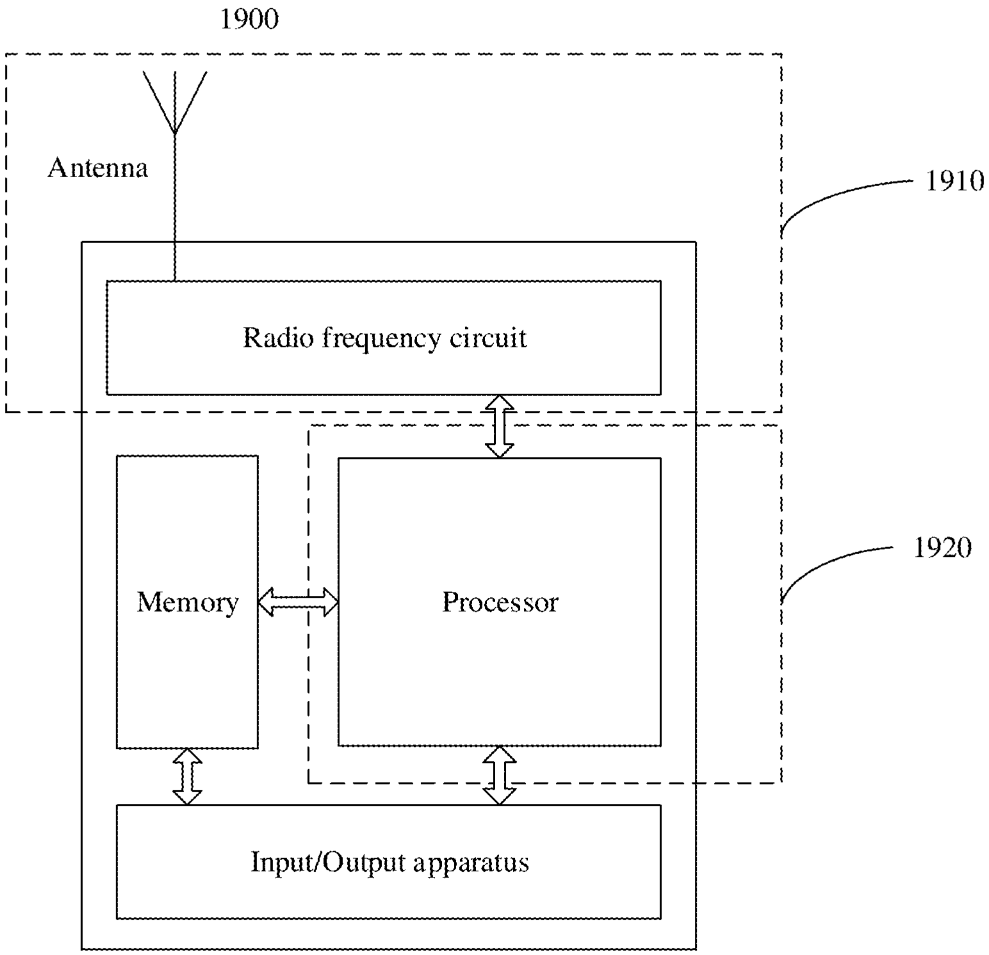
FIG. 19 is a schematic block diagram of a first device according to at least one embodiment.

In response to the communication apparatus 1900 being the first device, the communication apparatus 1900 is, for example, a multi-link device such as a multi-link station device. FIG. 19 is a simplified schematic diagram of a structure of the first device. As shown in FIG. 19, the first device includes a processor, a memory, a radio frequency circuit, an antenna, and an input/output apparatus. The processor is mainly configured to: process a communication protocol and communication data, control the first device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, a keyboard, or the like is mainly configured to: receive data input by a user, and output data to the user. Some types of first devices have no input/output apparatus.

In response to sending data, after performing baseband processing on the to-be-sent data, the processor outputs a baseband signal to the radio frequency circuit. The radio frequency circuit performs radio frequency processing on the baseband signal, and then sends a radio frequency signal to outside in the form of the electromagnetic wave by using the antenna. In response to data being sent to the first device, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 19 shows only one memory and one processor. In an actual first device product, there is one or more processors and one or more memories. The memory is also referred to as a storage medium, a storage device, or the like. The memory is disposed independent of the processor, or is integrated with the processor. This is not limited in embodiments described herein.

In at least one embodiment, the antenna that has sending and receiving functions and the radio frequency circuit is considered as a transceiver unit of the first device, and the processor that has a processing function is considered as a processing unit of the first device.

As shown in FIG. 19, the first device includes a transceiver unit 1910 and a processing unit 1920. The transceiver unit 1910 is also referred to as a transceiver, a transceiver machine, a transceiver apparatus, or the like. The processing unit 1920 is also referred to as a processor, a processing board, a processing module, a processing apparatus, or the like.

Optionally, a component that is in the transceiver unit 1910 and that is configured to implement a receiving function is considered as a receiving unit, and a component that is in the transceiver unit 1910 and that is configured to implement a sending function is considered as a sending unit. In other words, the transceiver unit 1910 includes the receiving unit and the sending unit. The transceiver unit is also sometimes referred to as a transceiver machine, a transceiver, a transceiver circuit, or the like. The receiving unit is also sometimes referred to as a receiver machine, a receiver, a receiver circuit, or the like. The sending unit is also sometimes referred to as a transmitter machine, a transmitter, a transmitter circuit, or the like.

In at least one embodiment, the processing unit 1920 is configured to perform a processing action on the first device side in FIG. 3. For example, the processing unit 1920 is configured to perform a processing step in step 3201 or step 3202 in FIG. 3, and the transceiver unit 1910 is configured to perform receiving and sending operations in step 310 in FIG. 3.

In at least one embodiment, the processing unit 1920 is configured to perform a processing step in step 603 in FIG. 6, and the transceiver unit 1910 is configured to perform receiving and sending operations in steps 610, 620, 630, 601, 602, and 605 in FIG. 6.

In at least one embodiment, the transceiver unit 1910 is configured to perform receiving and sending operations in steps 710, 720, and 730 in FIG. 7.

In at least one embodiment, the processing unit 1920 is configured to perform processing steps in steps 1030 and 1050 in FIG. 10, and the transceiver unit 1910 is configured to perform receiving and sending operations in steps 1010, 1020, 1040, and 1060 in FIG. 11.

In at least one embodiment, the transceiver unit 1910 is configured to perform receiving and sending operations in steps 1110 and 1120 in FIG. 11.

FIG. 19 is an example instead of a limitation. The first device including the transceiver unit and the processing unit do not depend on the structure shown in FIG. 19.

In response to the communication apparatus 1900 being a chip, the chip includes a transceiver unit and a processing unit. The transceiver unit is an input/output circuit or a communication interface. The processing unit is a processor, a microprocessor, or an integrated circuit that is integrated on the chip. Certainly, in response to the communication apparatus 1900 being a chip system or a processing system, a device in which the communication apparatus 1900 is installed implements the methods and the functions in embodiments described herein. For example, the processing unit 1920 is a chip system or a processing circuit in a processing system, to control a device in which the chip system or the processing system is installed. The processing unit 1920 is further coupled to a storage unit, and invoke instructions in the storage unit, so that the device implements the methods and the functions described herein. The transceiver unit 1910 is an input/output circuit in the chip system or the processing system, to output information processed by the chip system, or input to-be-processed data or signaling information into the chip system for processing. The communication apparatus 1900 is, for example, a Wi-Fi chip. Therefore, an apparatus in which the chip is installed communicates with another device by using the 802.11 protocol.

At least one embodiment further provides a communication apparatus 2000. The communication apparatus 2000 is a second device or a chip. The communication apparatus 2000 is configured to perform an operation performed by the second device in the foregoing method embodiments.

Figure 20:
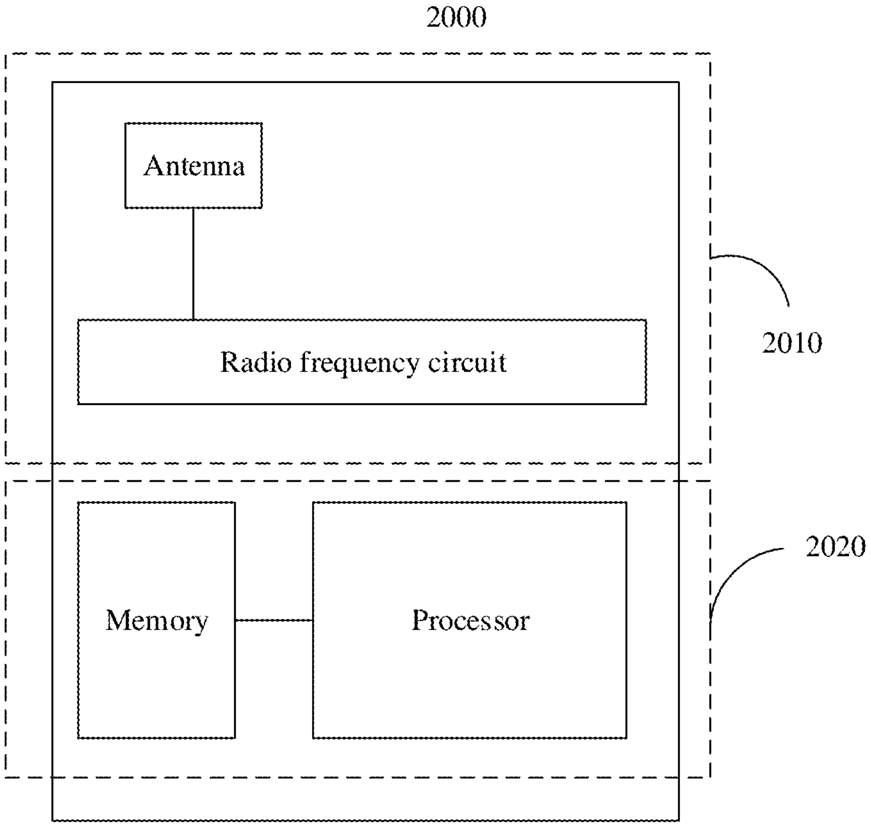
FIG. 20 is a schematic block diagram of a second device according to at least one embodiment.

In response to the communication apparatus 2000 being the second device, the communication apparatus 2000 is, for example, a multi-link device such as a multi-link access point device. FIG. 20 is a simplified schematic diagram of a structure of the second device. The second device includes a part 2010 and a part 2020. The part 2010 is mainly configured to send and receive a radio frequency signal and perform conversion between the radio frequency signal and a baseband signal. The part 2020 is mainly configured to perform baseband processing, control the second device, and the like. The part 2010 is usually referred to as a transceiver unit, a transceiver machine, a transceiver circuit, a transceiver, or the like. The part 2020 is usually a control center of the second device, is usually referred to as a processing unit, and is configured to control the second device to perform a processing operation on the network device side in the foregoing method embodiments.

The transceiver unit in the part 2010 is also referred to as a transceiver or the like. The transceiver unit includes an antenna and a radio frequency circuit, where the radio frequency circuit is mainly configured to perform radio frequency processing. Optionally, a component that is in the part 2010 and that is configured to implement a receiving function is considered as a receiving unit, and a component that is configured to implement a sending function is considered as a sending unit. In other words, the part 2010 includes the receiving unit and the sending unit. The receiving unit is also referred to as a receiver machine, a receiver, a receiver circuit, or the like, and the sending unit is referred to as a transmitter, a transmitter circuit, or the like.

The part 2020 includes one or more boards, and each board includes one or more processors and one or more memories. The processor is configured to read and execute a program in the memory to implement a baseband processing function and control the second device. In response to there are a plurality of boards, the boards is interconnected to enhance a processing capability. In an optional implementation, a plurality of boards share one or more processors, a plurality of boards share one or more memories, or a plurality of boards simultaneously share one or more processors.

For example, in an implementation, the transceiver unit in the part 2010 is configured to perform receiving/sending-related steps performed by the second device in the embodiment shown in FIG. 3, and the part 2020 is configured to perform processing-related steps performed by the second device in the embodiment shown in FIG. 3.

For another example, in an implementation, the transceiver unit in the part 2010 is configured to perform receiving/sending-related steps performed by the second device in the embodiment shown in FIG. 6, and the part 2020 is configured to perform processing-related steps performed by the second device in the embodiment shown in FIG. 6.

For another example, in an implementation, the transceiver unit in the part 2010 is configured to perform receiving/sending-related steps performed by the second device in the embodiment shown in FIG. 7, and the part 2020 is configured to perform processing-related steps performed by the second device in the embodiment shown in FIG. 7.

For another example, in an implementation, the transceiver unit in the part 2010 is configured to perform receiving/sending-related steps performed by the second device in the embodiment shown in FIG. 10, and the part 2020 is configured to perform processing-related steps performed by the second device in the embodiment shown in FIG. 10.

For another example, in an implementation, the transceiver unit in the part 2010 is configured to perform receiving/sending-related steps performed by the second device in the embodiment shown in FIG. 11, and the part 2020 is configured to perform processing-related steps performed by the second device in the embodiment shown in FIG. 11.

FIG. 20 is an example instead of a limitation. The second device including the transceiver unit and the processing unit does not depend on the structure shown in FIG. 20.

In response to the communication apparatus 2000 being a chip, the chip includes a transceiver unit and a processing unit. The transceiver unit is an input/output circuit or a communication interface. The processing unit is a processor, a microprocessor, or an integrated circuit integrated on the chip. Certainly, the communication apparatus 2000 is alternatively a chip system or a processing system, a device in which the communication apparatus 2000 is installed implements the methods and the functions in embodiments described herein. For example, the processing unit 2020 is a chip system or a processing circuit in a processing system, to control a device in which the chip system or the processing system is installed. The processing unit 2020 is further coupled to a storage unit, and invoke instructions in the storage unit, so that the device implements the methods and the functions in embodiments described herein. The transceiver unit 2010 is an input/output circuit in the chip system or the processing system, to output information processed by the chip system, or input to-be-processed data or signaling information into the chip system for processing. The communication apparatus 2000 is, for example, a Wi-Fi chip. Therefore, an apparatus in which the chip is installed communicates with another device by using the 802.11 protocol.

At least one embodiment further provides a computer-readable storage medium. The computer-readable storage medium stores computer instructions used to implement the method performed by the first device or the method performed by the second device in the foregoing method embodiments.

For example, in response to the computer program being executed by a computer, the computer is enabled to implement the method performed by the first device or the method performed by the second device in the foregoing method embodiments.

At least one embodiment further provides a computer program product including instructions. In response to the instructions being executed by a computer, the computer is enabled to implement the method performed by the first device or the method performed by the second device in the foregoing method embodiments.

At least one embodiment further provides a communication system. The communication system includes the first device and the second device in the foregoing embodiments.

For explanations and beneficial effects of related content of any communication apparatus provided above, refer to a corresponding method embodiment provided above. Details are not described herein again.

The processor mentioned in embodiments of this application is a central processing unit (CPU), the processor is further another general-purpose processor, a digital signal processor (DSP), an application-specific integrated circuit (ASIC), a field programmable gate array (FPGA), or another programmable logic device, a discrete gate, a transistor logic device, a discrete hardware component, or the like. The general-purpose processor is a microprocessor, or the processor is any conventional processor or the like.

the memory mentioned in embodiments described herein is a volatile memory or a non-volatile memory, or includes a volatile memory and a non-volatile memory. The non-volatile memory is a read-only memory (ROM), a programmable read-only memory (PROM), an erasable programmable read-only memory (EPROM), an electrically erasable programmable read-only memory (EEPROM), or a flash memory. The volatile memory is a random access memory (RAM). For example, the RAM is used as an external cache. By way of example but not limitation, the RAM includes a plurality of forms in the following: a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

In response to the processor being a general-purpose processor, a DSP, an ASIC, an FPGA, another programmable logic device, a discrete gate or a transistor logic device, or a discrete hardware component, the memory (storage module) is integrated into the processor.

The memory described in this specification is intended to include, but is not limited to, these memories and any other memory of a suitable type.

A person of ordinary skill in the art is aware that, in combination with the examples described in embodiments disclosed in this specification, units and methods is implemented by electronic hardware or a combination of computer software and electronic hardware. Whether the functions are performed by hardware or software depends on particular applications and design constraints of the technical solutions. A person skilled in the art uses different methods to implement the described functions, but the implementation does not goes beyond the protection scope of embodiments described herein.

For the purpose of convenient and brief description, for a detailed working process of the foregoing apparatus and unit, refer to a corresponding process in the foregoing method embodiment. Details are not described herein again.

In the embodiments described herein, the disclosed apparatuses and methods are implemented in other manners. For example, the described apparatus embodiment is merely an example. For example, division into the units is merely logical function division and is other division in an actual implementation. For example, a plurality of units or components is combined or integrated into another system, or some features is ignored or not performed. In addition, the displayed or discussed mutual couplings or direct couplings or communication connections is implemented through some interfaces. The indirect couplings or communication connections between the apparatuses or units is implemented in electronic forms, mechanical forms, or other forms.

The units described as separate parts may or may not be physically separate, and parts displayed as units may or may not be physical units, is located in one position, or is distributed on a plurality of network units. Some or all of the units is selected based on an actual requirement to implement the solutions provided in embodiments described herein.

In addition, function units in embodiments described herein are integrated into one unit, or each of the units exist alone physically, or two or more units are integrated into one unit.

At least one embodiment is implemented by using software, hardware, firmware, or any combination thereof. In response to the software being used, all or a part of at least one embodiment is implemented in a form of a computer program product. The computer program product includes one or more computer instructions. In response to the computer program instructions being loaded and executed on the computer, the procedures or functions are all or partially generated. The computer is a general-purpose computer, a special-purpose computer, a computer network, or another programmable apparatus. For example, the computer is a personal computer, a server, a network device, or the like. The computer instructions is stored in a computer-readable storage medium or is transmitted from a computer-readable storage medium to another computer-readable storage medium. For example, the computer instructions is transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium is any usable medium accessible by the computer, or a data storage device, for example, a server or a data center, integrating one or more usable media. The usable medium is a magnetic medium (for example, a floppy disk, a hard disk, or a magnetic tape), an optical medium (for example, a DVD), a semiconductor medium (for example, a solid state disk (solid state disk, SSD)), or the like. For example, the usable medium includes but is not limited to any medium that stores program code, such as a USB flash drive, a removable hard disk, a read-only memory (ROM), a random access memory (RAM), a magnetic disk, or an optical disc.

The foregoing description describes at least one embodiment, but is not intended to limit the protection scope of embodiments described herein. Any variation or replacement readily figured out by a person skilled in the art within the technical scope disclosed herein falls within the protection scope of embodiments described herein. Therefore, the protection scope of embodiments described herein are subject to the protection scope of the claims and the specification.

What is claimed is:

1. A communication mode switching method, comprising:

sending, by a first device, a first message to a second device, wherein the first message is used to notify the second device that the first device enters a multi-link spatial multiplexing power save mode;

after receiving a second message from the second device, switching, by the first device, to the multi-link spatial multiplexing power save mode, wherein the second message is a response message or an acknowledgment message in response to the first message;

receiving, by the first device, a radio frame from the second device, wherein the radio frame indicates the first device to perform link configuration switching; and switching, by the first device, from performing communication using a second configuration to performing communication using a first configuration, wherein under the first configuration, the first device performs communication on N links, under the second configuration, the first device performs communication on M links, M is an integer greater than 1 or equal to 1, N is an integer greater than 2 or equal to 2, and N is greater than M.

2. The method according to claim 1, wherein the first device performs communication using a multi-link spatial multiplexing power save mode, and the multi-link spatial multiplexing power save mode includes:

performing, by the first device, communication using the second configuration, or switching, by the first device, between the first configuration and the second configuration for communication.

3. The method according to claim 1, wherein the method further comprises:

after transmission of data between the first device and the second device using the first configuration ends, switching, by the first device, to the second configuration for communication.

4. The method according to claim 1, wherein the performing communication, by the first device, with the second device using the first configuration comprises:

receiving, by the first device, a data frame from the second device on T links, wherein Tis an integer greater than 1 or equal to 1; and the method further comprises:

providing, by the data frame on each of the T links, a more data field, wherein the more data field in the data frame on the link indicates whether transmission of data on the corresponding link ends, and the first device determines, based on the more data field on each link, whether the transmission of data ends; or providing, by the data frame, a multi-link more data field, wherein the multi-link more data field indicates whether the transmission of data on the T links ends, and the first device determines, based on the multi-link more data field, whether the transmission of data ends.

5. The method according to claim 1, wherein the method further comprises:

sending, by the first device, indication information to a station of the second device, wherein the indication information includes information about the first configuration or information about the second configuration, and indicating, using the indication information, configuration information of each station on one or more links of the first device.

6. The method according to claim 5, wherein the sending the indication information including the information about the first configuration or the information about the second configuration includes sending one or more pieces of the following information:

an identifier of a link, a number of spatial streams of the link, bandwidth of the link, whether to support uplink multi-user transmission, and whether to support an extended-range transmission mode.

7. The method according to claim 1, wherein the sending, by the first device to the second device, the first message includes sending a control field, wherein the control field includes a first field, the first field is used to notify the second device that whether the first device enters the multi-link spatial multiplexing power save mode, and a value of the first field is used to indicate the first device enters the multi-link spatial multiplexing power save mode.

8. A first device applied to multi-link communication, comprising:

a non-volatile memory storage including instructions; and one or more processors in communication with the memory, wherein the one or more processors execute the instructions to:

send a first message to a second device, wherein the first message is used to notify the second device that the first device enters a multi-link spatial multiplexing power save mode;

after receiving a second message from the second device, switch to the multi-link spatial multiplexing power save mode, wherein the second message is a response message or an acknowledgment message in response to the first message;

receive a radio frame from the second device, wherein the radio frame indicates the first device to perform link configuration switching; and switch from performing communication using a second configuration to performing communication using a first configuration, under the first configuration, the one or more processors perform communication on N links, under the second configuration, the one or more processors perform communication on M links, M is an integer greater than 1 or equal to 1, N is an integer greater than 2 or equal to 2, and N is greater than M.

9. The first device according to claim 8, wherein the one or more processors are in a multi-link spatial multiplexing power save mode, and the multi-link spatial multiplexing power save mode includes:

communication using the second configuration, or a switch between the first configuration and the second configuration for communication.

10. The first device according to claim 8, wherein after transmission of data between the first device and the second device by using the first configuration ends, the first device switches to the second configuration for communication.

11. The first device according to claim 8, wherein the one or more processors perform communication with the second device using the first configuration by:

receiving a data frame from the second device on T links, wherein Tis an integer greater than 1 or equal to 1; and the data frame on each of the T links includes a more data field, wherein the more data field in the data frame on the link indicates whether transmission of data on the corresponding link ends, and the one or more processors determine, based on the more data field on each link, whether the transmission of data ends; or the data frame includes a multi-link more data field, the multi-link more data field indicates whether the transmission of data on the T links ends, and the one or more processors determine, based on the multi-link more data field, whether the transmission of data ends.

12. The first device according to claim 8, wherein the one or more processors are configured to:

send indication information to a station of the second device, wherein the indication information includes information about the first configuration or information about the second configuration, and the indication information indicates configuration information of each station on one or more links of the one or more processors.

13. The first device according to claim 12, wherein the information about the first configuration or the information about the second configuration includes one or more pieces of the following information:

an identifier of a link, a number of spatial streams of the link, bandwidth of the link, whether to support uplink multi-user transmission, and whether to support an extended-range transmission mode.

14. The first device according to claim 8, wherein the first message includes a control field, wherein the control field includes a first field, the first field is used to notify the second device whether the one or more processors enter the multi-link spatial multiplexing power save mode, and a value of the first field is used to indicate the one or more processors enter the multi-link spatial multiplexing power save mode.

15. A non-volatile computer-readable media storing computer instructions for multi-link communication, that when executed by one or more processors, cause the one or more processors to perform the steps of:

sending a first message to a second device, wherein the first message is used to notify the second device that the one or more processors enter a multi-link spatial multiplexing power save mode;

after receiving a second message from the second device, switching to the multi-link spatial multiplexing power save mode, wherein the second message is a response message or an acknowledgment message in response to the first message;

receiving a radio frame from the second device, wherein the radio frame indicates the one or more processors are to perform link configuration switching; and switching from performing communication using a second configuration to performing communication using a first configuration, wherein under the first configuration, the one or more processors perform communication on N links, under the second configuration, the one or more processors perform communication on M links, M is an integer greater than 1 or equal to 1, N is an integer greater than 2 or equal to 2, and N is greater than M.

16. The non-volatile computer-readable media according to claim 15, wherein the one or more processors are in a multi-link spatial multiplexing power save mode, and the multi-link spatial multiplexing power save mode includes:

perform, by the one or more processors, communication using the second configuration, or switch, by the one or more processors, between the first configuration and the second configuration for communication.

17. The non-volatile computer-readable media according to claim 15, wherein after transmission of data between the one or more processors and the second device using the first configuration ends, the one or more processors switch to the second configuration for communication.

18. The non-volatile computer-readable media according to claim 15, wherein the performing communication, by the one or more processors, with the second device using a first configuration includes:

receiving a data frame from the second device on T links, wherein Tis an integer greater than 1 or equal to 1; and providing, by the data frame on each of the T links, a more data field, wherein the more data field in the data frame on the link indicates whether transmission of data on the corresponding link ends, and the one or more processors determine, based on the more data field on each link, whether the transmission of data ends; or providing, by the data frame, a multi-link more data field, wherein the multi-link more data field indicates whether the transmission of data on the T links ends, and the one or more processors determine, based on the multi-link more data field, whether the transmission of data ends.

19. The non-volatile computer-readable media according to claim 15, further comprising:

sending indication information to a station of the second device, wherein the indication information includes information about the first configuration or information about the second configuration, and indicating, using the indication information, configuration information of each station on one or more links of the one or more processors.

20. The non-volatile computer-readable media according to claim 19, wherein the sending the indication information including the information about the first configuration or the information about the second configuration includes sending one or more pieces of the following information:

an identifier of a link, a number of spatial streams of the link, bandwidth of the link, whether to support uplink multi-user transmission, and whether to support an extended-range transmission mode.

21. The first device according to claim 15, wherein the sending the first message to the second device includes sending a control field, wherein the control field includes a first field, the first field is used to notify the second device that whether the one or more processors enter the multi-link spatial multiplexing power save mode, and a value of the first field is used to indicate the one or more processors enter the multi-link spatial multiplexing power save mode.

* * * * *